(12) United States Patent
Lee

(10) Patent No.: US 7,765,822 B2
(45) Date of Patent: Aug. 3, 2010

(54) AIR CONDITIONING SYSTEM HAVING SELF-SUSTAINED POWER SUPPLY APPARATUS FOR ENGINE-DRIVEN TRANSPORTATION TOOLS

(75) Inventor: Wang-Sheng Lee, Taipei (TW)

(73) Assignee: Memetics Technology Co. Ltd., Taipei (TW)

( * ) Notice: Subject to any disclaimer, the term of this patent is extended or adjusted under 35 U.S.C. 154(b) by 465 days.

(21) Appl. No.: 11/645,387

(22) Filed: Dec. 26, 2006

(65) Prior Publication Data
US 2007/0144194 A1 Jun. 28, 2007

(30) Foreign Application Priority Data
Dec. 27, 2005 (TW) .............. 94146867 A

(51) Int. Cl.
*F25B 27/00* (2006.01)
(52) U.S. Cl. .............. 62/236; 62/244; 62/323.1
(58) Field of Classification Search .......... 62/236, 62/244, 323.1
See application file for complete search history.

(56) References Cited

U.S. PATENT DOCUMENTS

| | | | | |
|---|---|---|---|---|
| 4,754,607 A | * | 7/1988 | Mackay | ............ 60/723 |
| 5,056,330 A | | 10/1991 | Isobe et al. | |
| 5,896,750 A | * | 4/1999 | Karl | ............ 62/236 |
| 6,049,185 A | | 4/2000 | Ikeda | |
| 6,731,035 B2 | | 5/2004 | Mu et al. | |
| 6,796,367 B2 | * | 9/2004 | Blacquiere et al. | ...... 165/41 |
| 6,978,632 B2 | * | 12/2005 | Suzuki et al. | ...... 62/228.5 |

FOREIGN PATENT DOCUMENTS

| | | |
|---|---|---|
| CA | 2 416 423 A1 | 7/2004 |
| CN | 1047381 A | 11/1990 |
| CN | 1539662 A | 10/2004 |
| DE | 197 03 209 C1 | 7/1998 |
| GB | 2 385 307 A | 8/2003 |

* cited by examiner

*Primary Examiner*—William E Tapolcai
(74) *Attorney, Agent, or Firm*—Volpe and Koenig PC

(57) ABSTRACT

The provided air conditioning system includes a self-sustained power supply apparatus, a motor coupled to the apparatus and receiving a first power supply, a first transmission system coupled to the motor and transmitting a first kinetic energy, a second transmission system coupled to the engine of a transportation tool and transmitting a second kinetic energy, a compressor coupled to one of the first transmission system and the second transmission system, receiving one of the first kinetic energy and the second kinetic energy and generating an air conditioning operation to an inner air of the transportation tool, and a switching apparatus coupled to a second power supply and employed to make one of the following results happen: the first transmission system is connected to the compressor, the second transmission system is connected to the compressor and the first and the second transmission systems are both separated from the compressor.

10 Claims, 21 Drawing Sheets

AIR CONDITIONING SYSTEM HAVING SELF-SUSTAINED POWER SUPPLY APPARATUS FOR ENGINE-DRIVEN TRANSPORTATION TOOLS

FIELD OF THE INVENTION

The present invention relates to the configurations of air-conditioning systems each having a self-sustained power supply system. More particularly, the present invention relates to the configurations of air-conditioning systems each having a self-sustained power supply system providing the required power supply continuously for engine-driven transportation tools.

BACKGROUND OF THE INVENTION

Nowadays, the whole world is facing the energy crisis and the dramatic challenges such as the world provided petroleum and natural gas reserves are limited, alternatives for the future energy sources having relatively better cost-effectiveness (such as solar energy) are either still under-development or not found. However, the widely used transportation tools such as the automobiles, the helicopters and the boats are driven by the engines and burning either the fuels fabricated from the cruel oil such as the gasoline and the heavy oil, or the natural gas. The air conditioning systems of those transportation tools are either driven by the engine of that specific transportation tool or driven by an electric motor, which is driven by the electric power provided by an engine-driven electric generator of that specific transportation tool. Thus, the air conditioning system will still consume certain energy source. Besides, the electric automobile is currently under R&D although certain results and even commercial products are known but there are still bottlenecks such as the lasting time and the recharging time of the battery of the electric automobile are not good enough to meet the consumers' requirements yet, and the highest speed of the electric automobiles is relatively lower than that of the engine-driven automobile. That is why the electric automobile is not widely used around the world. The present invention will focus on the air conditioning systems each having a compressor and using a coolant of or transportation tools for saving the energy resources. Please refer to FIG. 1, which is the schematic circuit diagram showing the configuration of a conventional air conditioning system 11 for an automobile 1. In which, the air conditioning system 11 includes a compressor 111, a switching apparatus 112 and a transmission system 113. The switching apparatus 112 is electrically connected to an automobile power supply 12, includes a switch 1121 and a clutch 1122, and the clutch 1122 is electrically connected to the switch 1121. The transmission system 113 includes a first crankshaft pulley 1131, a second crankshaft pulley 1132 and a belt 1133. In which, the clutch 1122 generates a magnetic field due to a current flowing through the clutch 1122 such that the clutch 1122 generates an attractive force to result in the first crankshaft pulley 1131 connecting with the compressor 111 to make an automobile engine 10 drive the compressor 111 via the transmission system 113 so as to generate an air conditioning operation when the switch 1121 is in the turn-on position. Furthermore, the clutch 1122 does not generate the magnetic field when there is no current flowing through the clutch 1122 such that the clutch 1122 is separated from the compressor 111, and the first crankshaft pulley 1131 is separated from the compressor 111 to make the automobile engine 10 stop to drive the compressor 111 when the switch 1121 is in the turn-off position. However, the transmission system 113 is still driven by the automobile engine 10 to revolve without load.

Referring to FIG. 2, it is the schematic circuit diagram showing the configuration of a conventional air conditioning system 21 for a helicopter 2. In which, the air conditioning system 21 includes a compressor 111, a switching apparatus 112 and a transmission system 211. The switching apparatus 112 is electrically connected to a helicopter power supply 22, includes a switch 1121 and a clutch 1122, and the clutch 1122 is electrically connected to the switch 1121. The transmission system 211 includes a gear box 2111. In which, the clutch 1122 generates a magnetic field due to a current flowing through the clutch 1122 such that the clutch 1122 generates an attractive force to result in the transmission system 211 (including the gear box 2111) connecting with the compressor 111 to make a helicopter engine 20 drive the compressor 111 via the transmission system 211 so as to generate an air conditioning operation when the switch 1121 is in the turn-on position. Besides, the clutch 1122 does not generate the magnetic field when there is no current flowing through the clutch 1122 such that the clutch 1122 is separated from the compressor 111, and the transmission system 211 (including the gear box 2111) is separated from the compressor 111 to make the helicopter engine 20 stop to drive the compressor 111 when the switch 1121 is in the turn-off position. However, the transmission system 211 is still driven by the helicopter engine 20 to revolve without load.

FIG. 3 is the schematic circuit diagram showing the configuration of a conventional air conditioning system 31 for a boat 3. The air conditioning system 31 includes a compressor 111, a switching apparatus 112 and a transmission system 311. In which, the switching apparatus 112 is electrically connected to a boat power supply 32, includes a switch 1121 and a clutch 1122, and the clutch 1122 is electrically connected to the switch 1121. The transmission system 311 includes a gear box 3111. In which, the clutch 1122 generates a magnetic field due to a current flowing through the clutch 1122 such that the clutch 1122 produces an attractive force to result in the transmission system 311 (including the gear box 3111) connecting with the compressor 111 to make a boat engine 30 drive the compressor 111 via the transmission system 311 so as to generate an air conditioning operation when the switch 1121 is in the turn-on position. Besides, the clutch 1122 does not generate the magnetic field when there is no current flowing through the clutch 1122 such that the clutch 1122 is separated from the compressor 111, and the transmission system 311 (including the gear box 3111) is separated from the compressor 111 to make the boat engine 30 stop to drive the compressor 111 when the switch 1121 is in the turn-off position. However, the transmission system 311 is still driven by the boat engine 30 to revolve without load.

Thus, the aforementioned air conditioning system for the engine-driven transportation tools that is driven by one selected from a group consisting of an engine, an electric power generated by the engine-driven generator and an electric motor receiving the electric power from the engine-driven generator could be modified to an air conditioning system having a self-sustained power supply apparatus including an autogenic power supply apparatus. The power supply for the air conditioning system is provided by the autogenic power supply apparatus continuously such that the energy consumption could be reduced. Since the transportation tool does not need to drive the air conditioning system or to provide the electric power for the air conditioning system, the transportation tool could have a relatively higher horsepower or a larger kinetic energy.

Currently, a device generating an autogenic energy continuously, which could be employed in driving a generator so as to generate an AC/DC output voltage, is proposed in U.S. Pat. No. 6,731,035. In the '035 patent, the provided device is driving a flywheel via the interactions between two permanent magnets to generate a kinetic energy continuously. However, the preferred embodiment and the relative contents of the '035 patent are focused on expressing how a proposed configuration of the proposed device could be employed to generate the autogenic energy continuously (see FIG. 4) but nothing regarding how to really use it in certain area is mentioned. Please refer to FIG. 4, an autogenic energy generating device 4 includes a base 422, a first magnetic device 450 having a first magnet 451, a second magnetic device 430 having a second magnet 431, a transmission member 420, and a linking device 440. Furthermore, the transmission member 420 includes a horizontal shaft 421 (the second magnet 431 is fixed to a rectangular intermediate portion 4211 of the horizontal shaft 421), the base 422 includes a first support plate 4221 (having a guide slot 4223) and a second support plate 4222, and the linking device 440 includes a linking rod 442, a connection rod 443 and a flywheel 444, which is employed to rotate the transmission member 420 continuously. Though, the '035 patent provides a simple configuration of the autogenic energy generating device 4 and the operational principles of the device 4, but nothing is mentioned regarding how the device 4 is employed to drive an AC/DC generator to generate an AC/DC power supply to be used in the related electronic equipment, e.g., the air conditioning systems for the engine-driven transportation tools of the present invention.

Since the DC generator has an extra commutator than the AC generator, thus relatively the DC generator has a more complex configuration and a higher manufacturing cost than those of the AC generator. Therefore, a self-sustained power supply apparatus includes an autogenic energy generating apparatus having the autogenic energy generating device and an AC generator, a rectifier, a regulator, and one of a DC/DC converter and a DC/AC inverter is provided in the present invention. In which, the AC generator receives the kinetic energy generated by the autogenic energy generating device so as to generate an AC output voltage firstly. The AC output voltage is rectified via a rectifier into a DC output voltage secondly. The DC output voltage is regulated by a voltage regulator thirdly. The regulated DC output voltage is input to one of a DC/DC converter and a DC/AC inverter to generate the DC/AC input voltage of the electronic equipment lastly. The DC/DC converter (or the DC/AC inverter) is employed to either boost or convert the regulated DC output voltage into the DC/AC input voltage. The air conditioning system for the engine-driven transportation tools receives the required DC/AC power supply continuously from the self-sustained power supply apparatus. And the engine-driven transportation tools have the effectiveness of saving the energy and having a relatively higher horsepower. The self-sustained power supply apparatus includes a switch turning off the apparatus when it is necessary to cut off the power supply of the air conditioning system for the maintenance or saving the energy resources.

Keeping the drawbacks of the prior arts in mind, and employing experiments and research full-heartily and persistently, the air conditioning system having a self-sustained power supply apparatus for engine-driven transportation tools is finally conceived by the applicant.

SUMMARY OF THE INVENTION

It is therefore an object of the present invention to provide an air conditioning system having a self-sustained power supply apparatus for engine-driven transportation tools such that the engine-driven transportation tools could have the effectiveness of saving the energy and having a relatively higher horsepower.

According to the first aspect of the present invention, an air conditioning system having a self-sustained power supply apparatus for a vehicle includes a motor receiving a first power supply from the apparatus and generating a kinetic energy, a transmission system transmitting the kinetic energy, a compressor, and a switching apparatus coupled to a second power supply and determining one of a connection and a separation between the transmission system and the compressor for optionally air conditioning the vehicle.

Preferably, the switching apparatus includes a switch determining one of a connection and a separation between the switching apparatus and the second power supply, and a clutch coupled to the switch and determining one of a connection and a separation between the transmission system and the compressor according to one of a power-on and a power-off of the switching apparatus respectively.

Preferably, the motor is a DC motor, and the compressor is coupled to the transmission system, receiving the kinetic energy, and generating an air conditioning operation for an interior air of the vehicle.

Preferably, the first power supply is a first DC power supply, the second power supply is a second DC power supply, and the self-sustained power supply apparatus includes an autogenic energy generating apparatus generating an AC power supply, a switch determining one of a turn-on and a turn-off of the generating apparatus, a rectifier rectifying the AC power supply into a third DC power supply, a regulator regulating the third DC power supply and generating a fourth DC power supply, and a DC/DC converter receiving and boosting the fourth DC power supply and generating the first DC power supply.

Preferably, the DC/DC converter is selected from a group consisting of a boost converter, a buck-boost converter and a flyback converter.

Preferably, the motor is an AC motor.

Preferably, the first power supply is a first AC power supply, the second power supply is a first DC power supply, and the self-sustained power supply apparatus includes an autogenic energy generating apparatus generating a second AC power supply, a switch determining one of a turn-on and a turn-off of the generating apparatus, a rectifier rectifying the second AC power supply into a second DC power supply, a regulator regulating the second DC power supply and generating a third DC power supply, and a DC/AC inverter receiving the third DC power supply and generating the first AC power supply.

Preferably, the air conditioning system provides an air conditioning operation including a heating operation and a cooling operation, and further including a temperature sensor, a condenser, an evaporator, one of an expansion valve and a capillary, a condenser fan and an evaporator fan, in which the second power supply is provided by the vehicle, and the compressor is a vehicle air conditioning compressor.

Preferably, the transmission system includes a first crankshaft pulley, a second crankshaft pulley, and a belt encircling the first and the second crankshaft pulleys.

Preferably, the vehicle is an engine-driven transportation tool being one selected from a group consisting of an automobile, a helicopter and a boat.

According to the second aspect of the present invention, an air conditioning system having a self-sustained power supply apparatus for an automobile having one of an engine and an electric motor, includes a motor receiving a first power supply from the apparatus and generating a first kinetic energy, a first transmission system transmitting the first kinetic energy, a second transmission system transmitting a second kinetic energy provided from one of the engine and the electric motor, a compressor, and a switching apparatus coupled to a second power supply for determining a status being one selected from a group consisting of the first transmission system being connected with the compressor, the second transmission system being connected with the compressor, and both of the first and the second transmission systems being separated from the compressor.

Preferably, the switching apparatus has at least an energy saving switching position, a normal operation switching position and a turn-off switching position, the first transmission system is connected to the compressor when the switching apparatus is in the energy saving switching position, the second transmission system is connected to the compressor when the switching apparatus is in the normal operation switching position, and the first and the second transmission systems are both separated from the compressor when the switching apparatus is in the turn-off switching position.

Preferably, the switching apparatus includes a switch switching among the energy saving switching position, the normal operation switching position and the turn-off switching position, a first clutch coupled to the switch and forming the connection between the first transmission system and the compressor when the switch is in the energy saving switching position, and a second clutch coupled to the switch and forming the connection between the second transmission system and the compressor when the switch is in the normal operation switching position, in which when the switch is in the turn-off switching position, the second power supply is turned off, and the first and the second transmission systems separate from the compressor through the first and the second clutches respectively.

Preferably, the motor is one of a DC motor and an AC motor, and the compressor is coupled to one of the first and the second transmission systems and receiving one of the first and the second kinetic energies respectively, and generating an air conditioning operation for an interior air of the automobile.

Preferably, the first transmission system includes a first crankshaft pulley, a second crankshaft pulley and a first belt encircling the first and the second crankshaft pulleys, and the second transmission system includes a third crankshaft pulley, a fourth crankshaft pulley and a second belt encircling the third and the fourth crankshaft pulleys.

According to the third aspect of the present invention, an air conditioning system having a self-sustained power supply apparatus for a helicopter having an engine includes a motor receiving a first power supply from the apparatus and generating a first kinetic energy, a first transmission system transmitting a first kinetic energy, a second transmission system transmitting a second kinetic energy provided from the engine, a compressor; and a switching apparatus coupled to a second power supply for determining a status being one selected from a group consisting of the first transmission system being connected with the compressor, the second transmission system being connected with the compressor, and both of the first and the second transmission systems being separated from the compressor.

Preferably, the first transmission system includes a first crankshaft pulley, a second crankshaft pulley and a belt encircling the first and the second crankshaft pulleys, the second transmission system includes a gear box, and the compressor is coupled to one of the first and the second transmission systems and receiving one of the first and the second kinetic energies respectively, and generating an air conditioning operation for an interior air of the helicopter.

According to the fourth aspect of the present invention, an air conditioning system having a self-sustained power supply apparatus for a boat having an engine, includes a motor receiving a first power supply from the apparatus and generating a first kinetic energy, a first transmission system transmitting the first kinetic energy, a second transmission system transmitting a second kinetic energy provided from the engine, a compressor coupled to one of the first and the second transmission systems and receiving one of the first and the second kinetic energies respectively, and generating an air conditioning operation for an interior air of the boat and a switching apparatus coupled to a second power supply for determining a status being one selected from a group consisting of the first transmission system being connected with the compressor, the second transmission system being connected with the compressor and both of the first and the second transmission systems being separated from the compressor.

According to the fifth aspect of the present invention, an air conditioning system having a self-sustained power supply apparatus for a vehicle having one of an engine and an electric motor includes a motor coupled to the apparatus for receiving a first power supply, a first transmission system transmitting a first kinetic energy, a second transmission system transmitting a second kinetic energy provided from one of the engine and the electric motor, a compressor coupled to one of the first and the second transmission systems and receiving one of the first and the second kinetic energies respectively and generating an air conditioning operation for an interior air of the vehicle and a switching apparatus coupled to a second power supply for determining a status being one selected from a group consisting of the first transmission system being connected with the compressor, the second transmission system being connected with the compressor and both of the first and the second transmission systems being separated from the compressor.

The present invention may be best understood through the following descriptions with reference to the accompanying drawings, in which:

DETAILED DESCRIPTION OF THE PREFERRED EMBODIMENT

Figure 1:
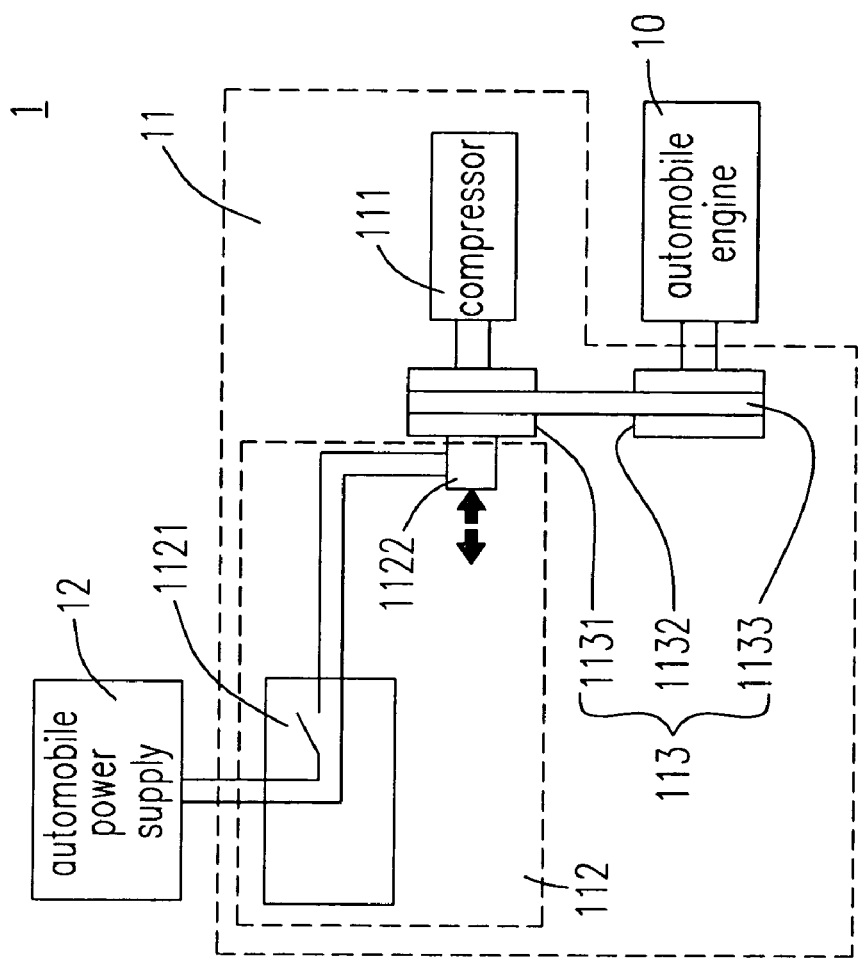
FIG. 1 is the schematic circuit diagram showing the configuration of a conventional air conditioning system for an automobile.
Figure 2:
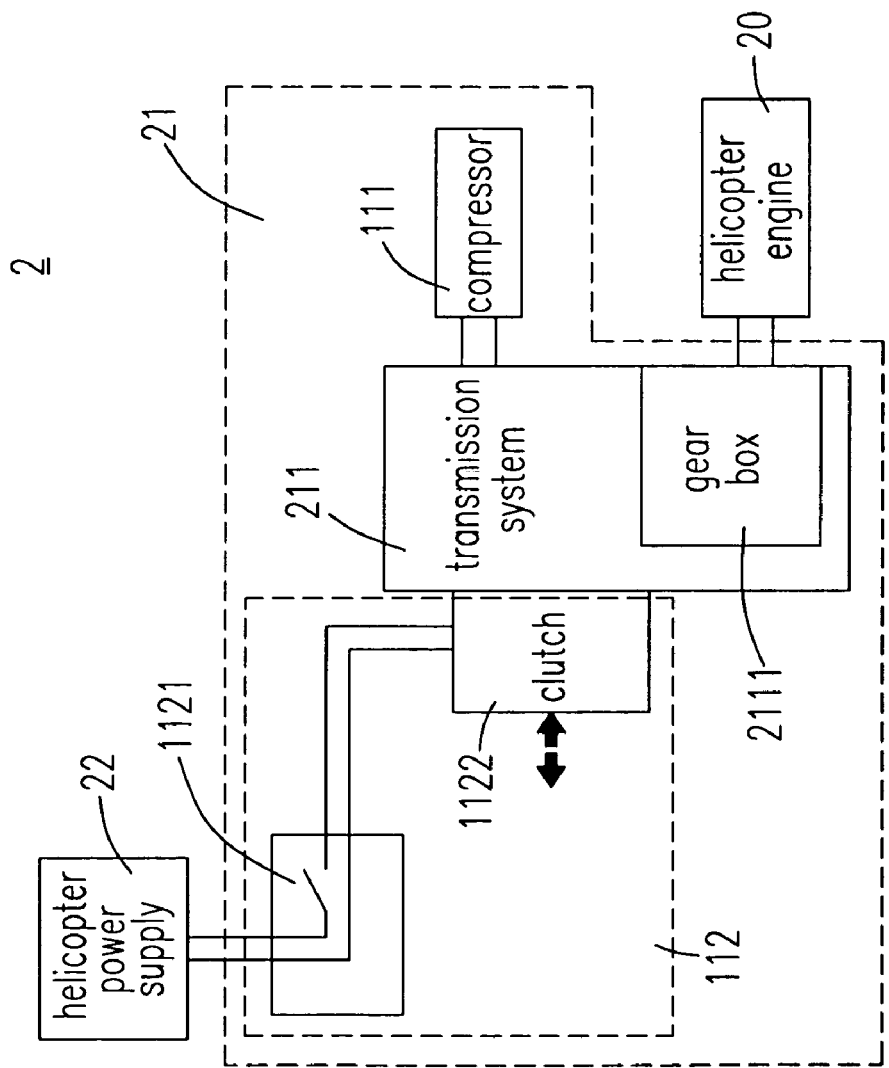
FIG. 2 is the schematic circuit diagram showing the configuration of a conventional air conditioning system for a helicopter.
Figure 3:
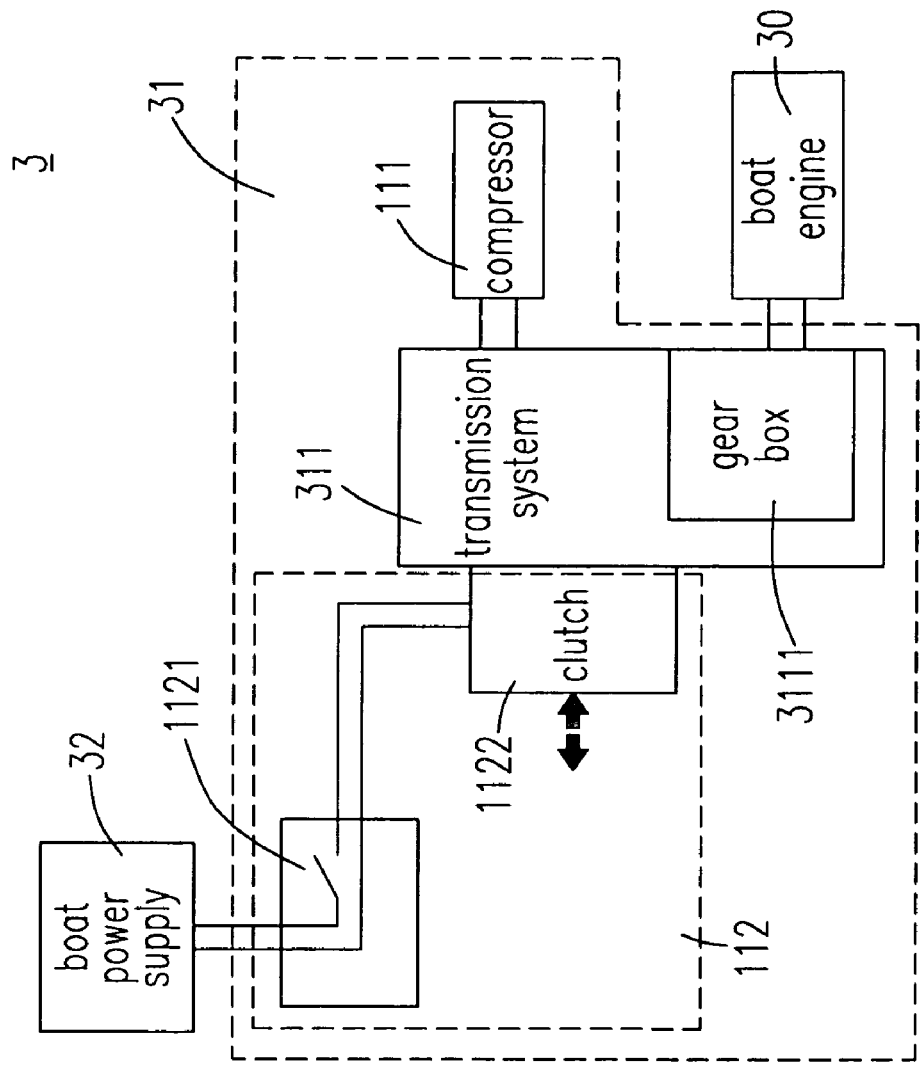
FIG. 3 is the schematic circuit diagram showing the configuration of a conventional air conditioning system for a boat.
Figure 4:
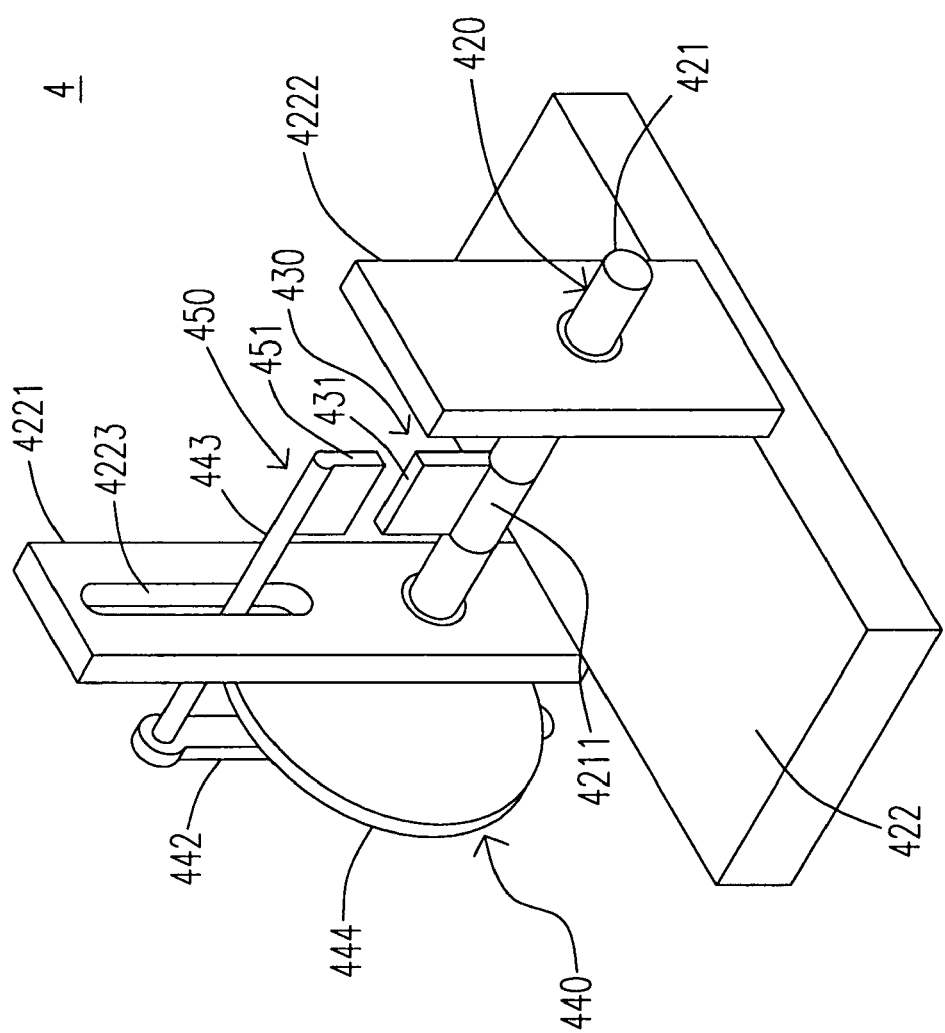
FIG. 4 is the schematic diagram showing the configuration of an autogenic energy generating device in the prior art.
Figure 5A:
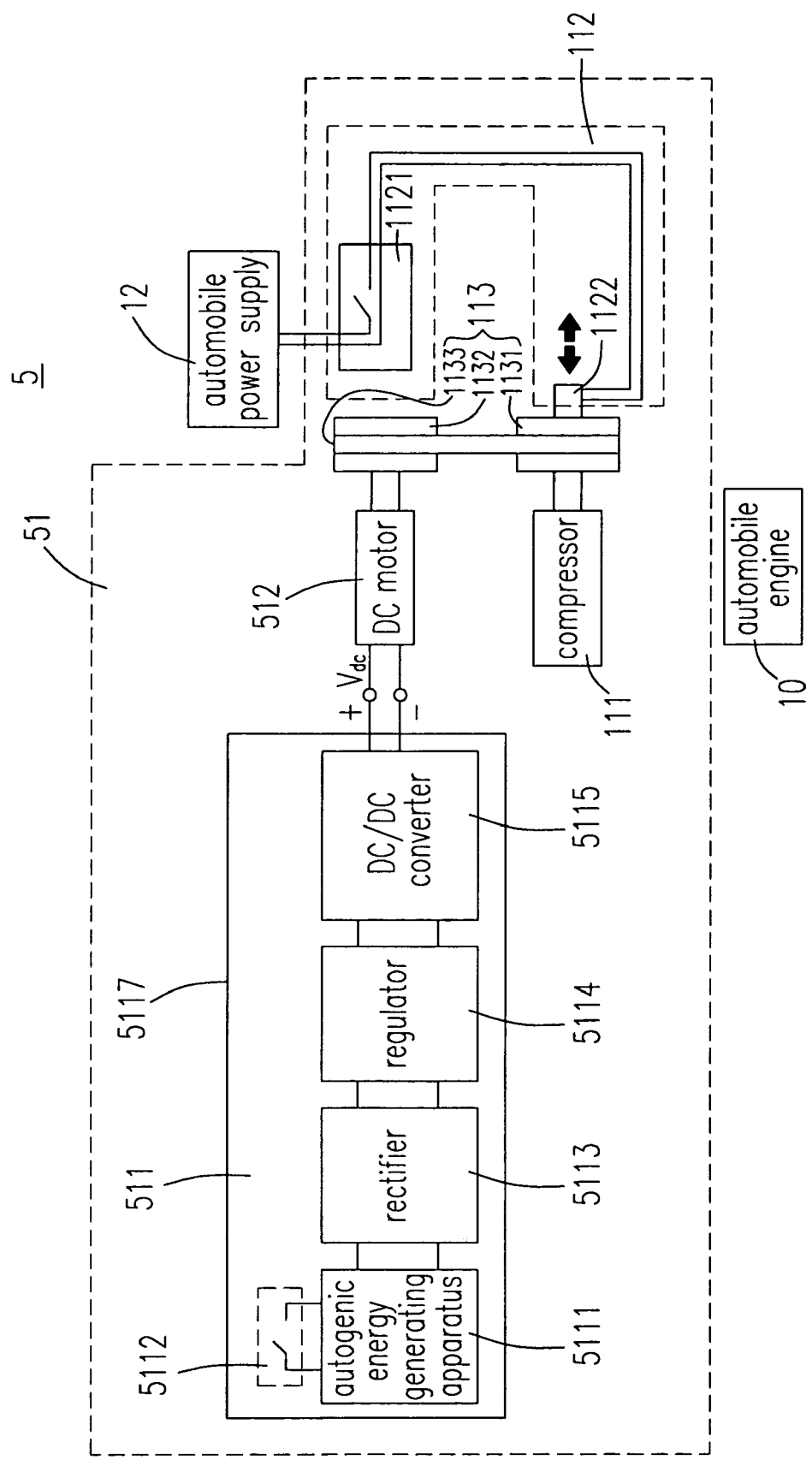
FIGS. 5(a) to 5(d) are the schematic circuit diagrams of an air conditioning system having a self-sustained power supply apparatus for an automobile according to the first to the fourth preferred embodiments of the automobile of the present invention respectively.

Please refer to FIG. 5(a), which shows the schematic circuit diagram of an air conditioning system 51 having a self-sustained power supply apparatus 511 for an automobile 5 according to the first preferred embodiment of the present invention. In FIG. 5(a), the automobile 5 includes an automobile engine 10, an automobile power supply 12 and the air conditioning system 51 having a self-sustained power supply system 511. The air conditioning system having a self-sustained power supply system 51 includes a self-sustained power supply system 511, a DC motor 512, a compressor 111, a switching apparatus 112 (including a switch 1121 and a clutch 1122) and a transmission system 113. In which, the transmission system 113 further includes a first crankshaft pulley 1131, a second crankshaft pulley 1132 and a belt 1133. The DC motor 512 couples to the self-sustained power supply system 511 and receives a first power supply. The switching apparatus 112 couples to the automobile power supply 12, receives a second power supply, and makes either a current flow through the clutch 1122 or no current flow through the clutch 1122 via a power-on and a power-off of the switch 1121 such that the clutch 1122 either generates a magnetic field, or does not generate the magnetic field so as to produce an attractive force via the magnetic field generated by the clutch 1122 (the direction of the attractive force is shown as an arrow pointing to the compressor 111 in FIG. 5(a)) or to produce a repulsive force generated by the clutch 1122 (the direction of the repulsive force is shown as an arrow in FIG. 5(a), which is opposite to the arrow pointing to the compressor 111) making the transmission system 113 connect to or separate from the compressor 111. In which, the DC motor 512 generates a kinetic energy due to the receiving of the first power supply, and the kinetic energy would be passed to the compressor 111 through the transmission system 113 when the transmission system 113 is connected to the compressor 111 such that the compressor 111 would provide an air conditioning operation. The air conditioning operation includes a heating operation and a cooling operation. Besides, the air conditioning system further includes a temperature sensor, a condenser, an evaporator, one of an expansion valve and a capillary, a condenser fan and an evaporator fan (not shown). Since the technology regarding the conventional air conditioning system is a well-known prior art, the details regarding the contents of the technology would be omitted here. Referring to FIG. 5(a), the first power supply is a first DC power supply Vdc, and the DC motor 512 receives the first DC power supply Vdc from the self-sustained power supply apparatus 511. The self-sustained power supply system 511 includes an autogenic energy generating apparatus 5111 having an autogenic energy generating device (not shown) generating a kinetic energy and an AC generator (not shown) receiving the kinetic energy and generating a first AC power supply continuously, a switch 5112 couple to the autogenic energy generating apparatus 5111 and turning on and off the autogenic energy generating apparatus 5111, a rectifier 5113 coupled to the autogenic energy generating apparatus 5111 rectifying the first AC power supply into a second DC power supply, a regulator 5114 coupled to the rectifier 5113 regulating the second DC power supply to generate a third DC power supply, a DC/DC converter 5115 coupled to the regulator 5114 and receiving and boosting the third DC power supply to generate the first DC power supply Vdc and a case 5117 containing the components 5111 to 5115 of the self-sustained power supply system 511.

Figure 5B:
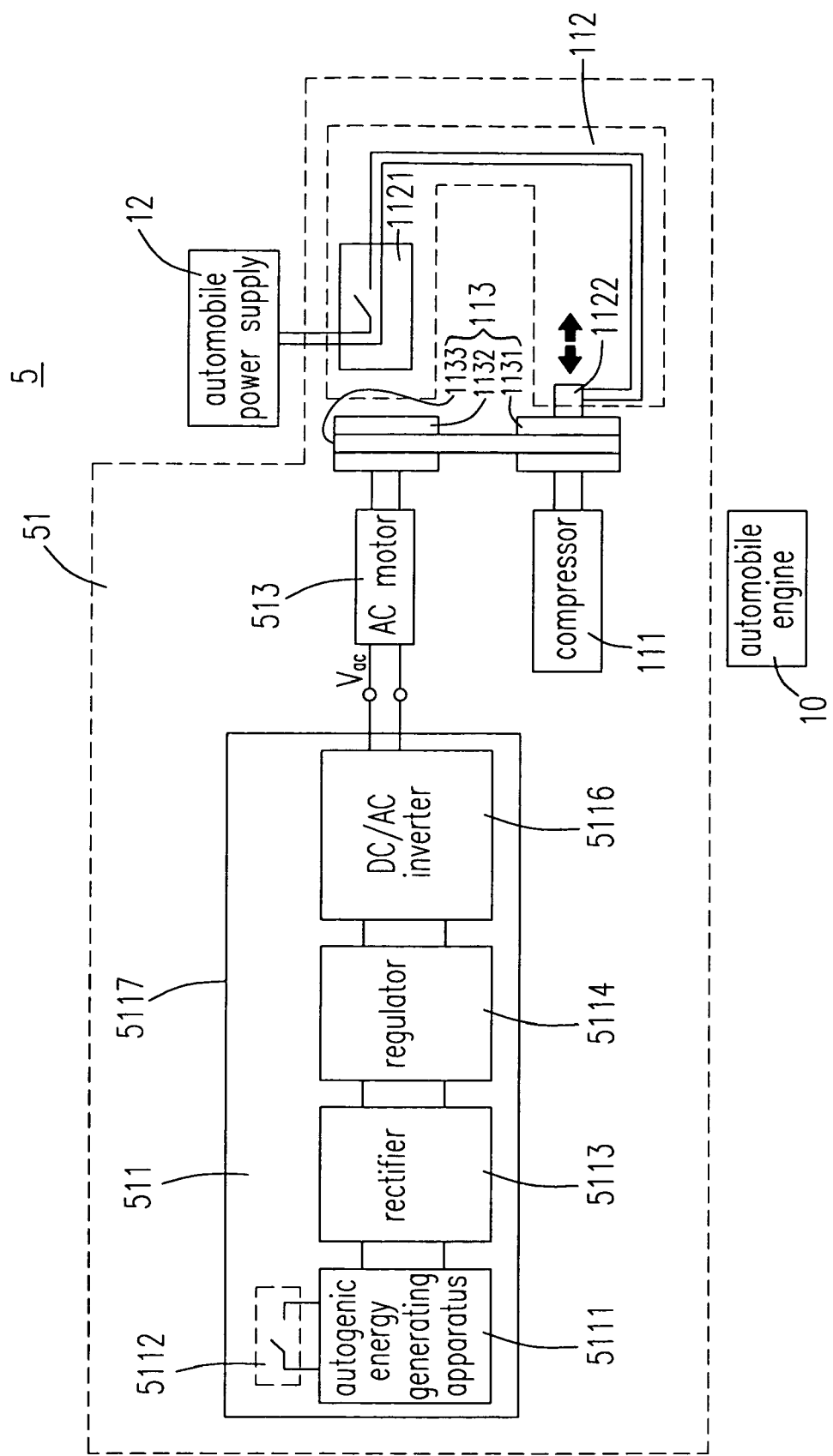

Please refer to FIG. 5(b), which shows the schematic circuit diagram of an air conditioning system 51 having a self-sustained power supply apparatus 511 for an automobile 5 according to the second preferred embodiment of the present invention. The differences between the second and the first preferred embodiments of the present invention are that the first power supply is a first AC power supply Vac thus the DC/DC converter 5115 of the self-sustained power supply apparatus 511 is replaced by a DC/AC inverter 5116 so as to generate a first AC power supply Vac, and the DC motor is replaced by a AC motor 513. The AC motor 513 receives the first AC power supply Vac output from the self-sustained power supply apparatus 511 and generates a kinetic energy. And the remaining portion of the configuration and the operational principles of the air conditioning system 51 in FIG. 5(b) are the same as those of FIG. 5(a).

Figure 5C:
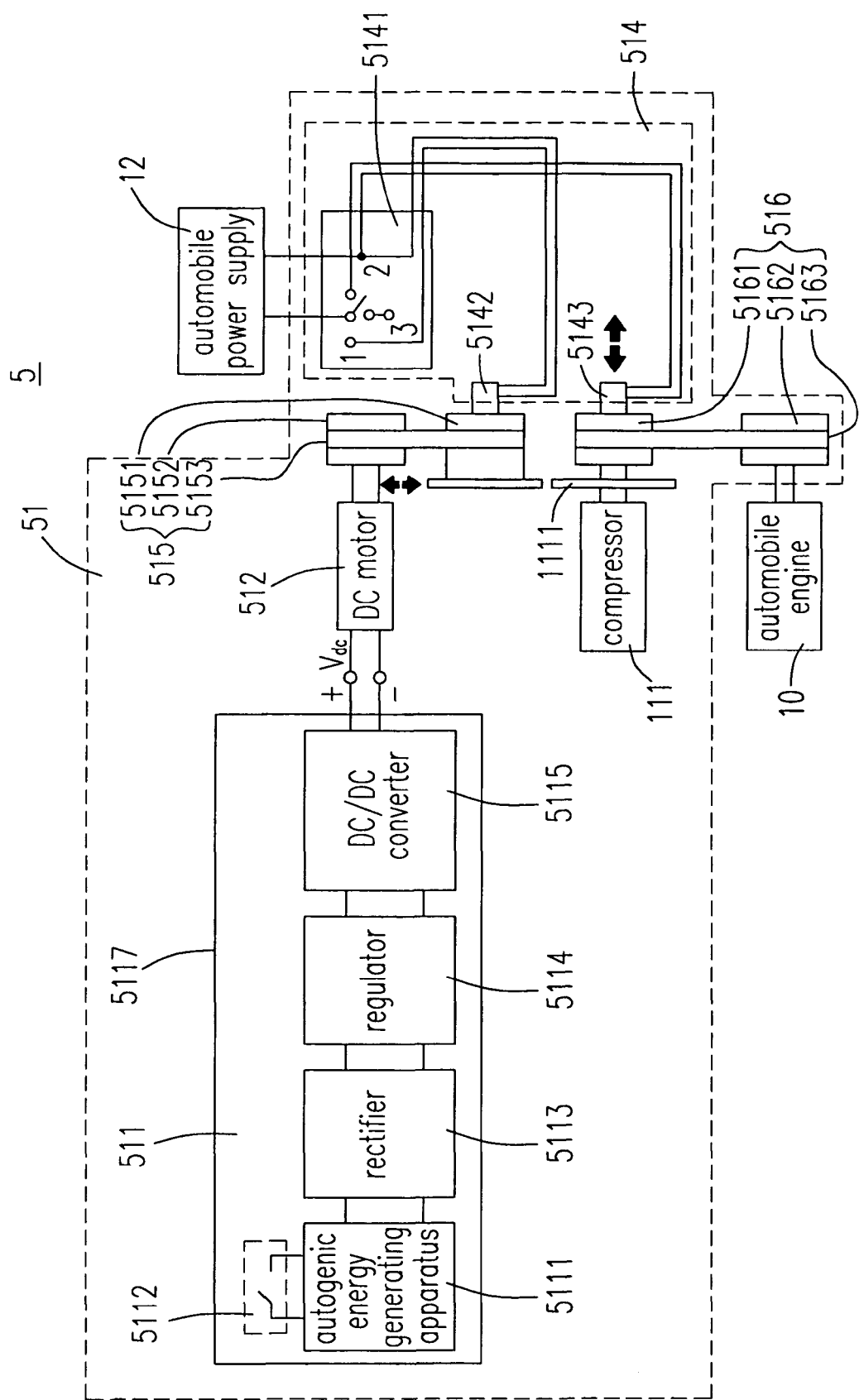
Figure 5D:
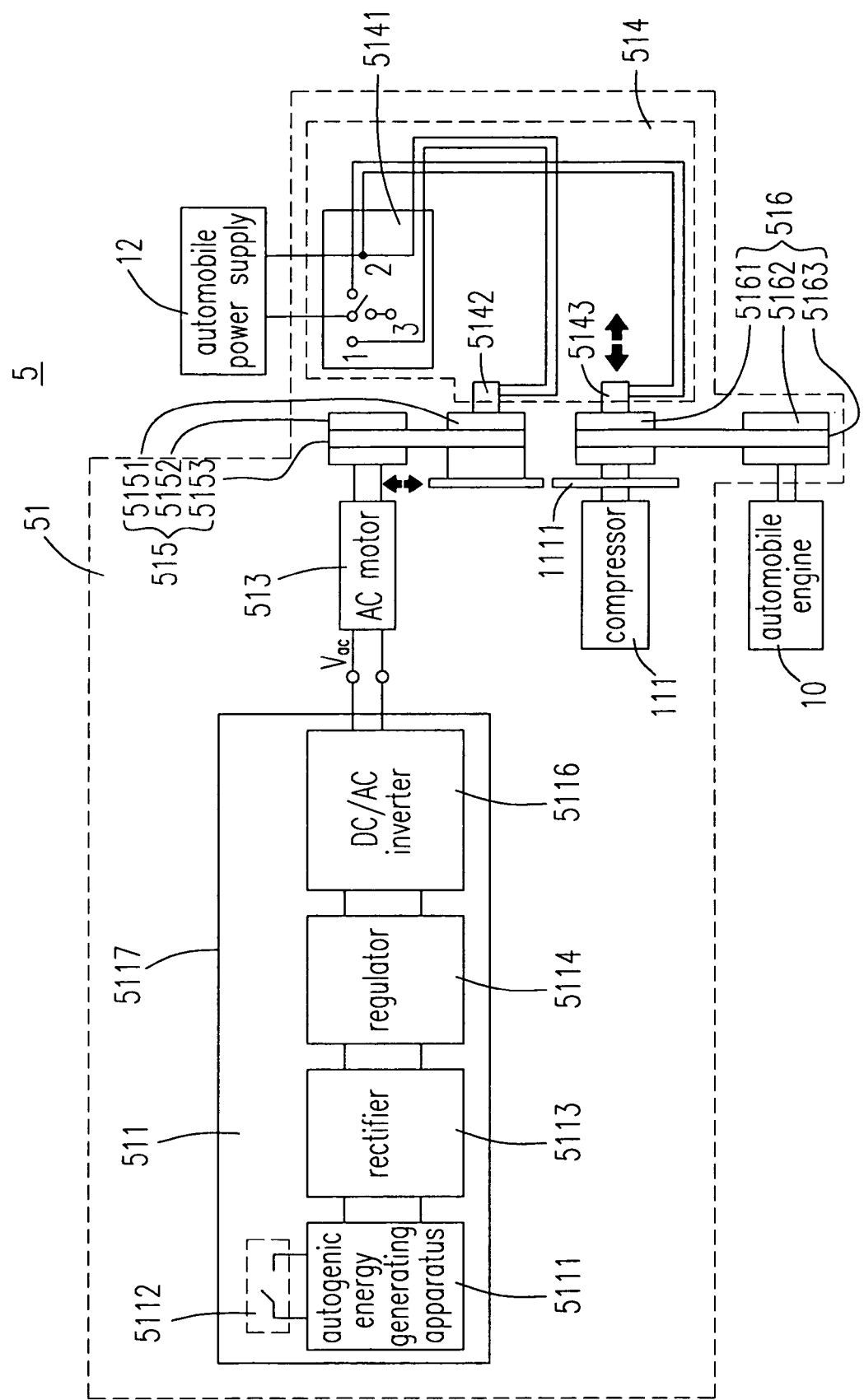

Please refer to FIG. 5(c), which shows the schematic circuit diagram of an air conditioning system 51 having a self-sustained power supply apparatus 511 for an automobile 5 according to the third preferred embodiment of the present invention. The configuration of the self-sustained power supply apparatus 511 of the air conditioning system 51 is the same as that of FIG. 5(a), the output is also the first DC power supply Vdc, and a DC motor 512 coupled to the first DC power supply is also employed to generate a kinetic energy. The differences between the third preferred embodiment and the first and the second preferred embodiments of the present invention are that the air conditioning system 51 further includes a switching apparatus 514, a first transmission system 515 and a second transmission system 516. In which, the switching apparatus 514 further includes a switch 5141, a first clutch 5142 and a second clutch 5143, the first transmission system 515 further includes a first crankshaft pulley 5151, a second crankshaft pulley 5152 and a first belt 5153, and the second transmission system 516 further includes a third crankshaft pulley 5161, a fourth crankshaft pulley 5162 and a second belt 5163. Besides, the first transmission system 515 couples to the DC motor 512, connects to or separates from the compressor 111 via a revolving shaft gear 1111 of the compressor 111 due to a switching operation of the switching apparatus 514. The second transmission system 516 couples to the compressor 111 and the automobile engine 10, and the second transmission system 516 also connects to or separates from the compressor 111 due to the switching operation of the switching apparatus 514.

A current flows through the first clutch 5142 makes the first clutch 5142 generate a first magnetic field to produce a first attractive force via the magnetic field generated by the clutch 5142 (the direction of the first attractive force is shown as an arrow pointing to the revolving shaft gear 1111 in FIG. 5(*c*)), which makes the first transmission system 515 connect to the revolving shaft gear 1111 receiving the kinetic energy generated by the DC motor 512 and transmitting to the compressor 111 when the switch 5141 is connected to the switching position 1. Since there is no current flowing through the second clutch 5143, the second clutch 5143 produces a first repulsive force (the direction of the first repulsive force is shown as an arrow in FIG. 5(*c*), which is opposite to the arrow pointing to the compressor 111) making the second transmission system 516 separate from the compressor 111. Since the air conditioning system 51 is driven by the kinetic energy generated by the DC motor, the air conditioning system 51 does not consume the kinetic energy generated by the automobile engine 10 so as to save the energy resources and let the automobile 5 to have a relatively higher horsepower. Thus, the switching position 1 is an energy saving switching position. Furthermore, a current flows through the second clutch 5143 makes the second clutch 5143 generate a second magnetic field to produce a second attractive force via the second magnetic field generated by the second clutch 5143 (the direction of the second attractive force is shown as an arrow pointing to the compressor 111 in FIG. 5(*c*)), which makes the second transmission system 516 connect to the compressor 111 such that the compressor 111 receives the kinetic energy generated by the automobile engine 10 when the switch 5141 is connected to the switching position 2. Since there is no current flowing through the first clutch 5142, the first clutch 5142 produces a second repulsive force (the direction of the second repulsive force is shown as an arrow in FIG. 5(*c*), which is opposite to the arrow pointing to the revolving shaft gear 1111) making the first transmission system 515 separate from the revolving shaft gear 1111, and the DC motor 512 stop to drive the compressor 111. Since the air conditioning system 51 is driven by the kinetic energy generated by the automobile engine 10, which can not save the energy resource, and also the automobile 5 can not have a relatively higher horsepower. Thus, the switching position 2 is a normal operation switching position. Since when there is no current flowing through the first and the second clutches 5142 and 5143, both of the first and the second clutches 5142 and 5143 produce a first and a second repulsive forces making the first and the second clutches 5142 and 5143 both separate from the compressor 111, thus the first and the second transmission systems 515 and 516 also both separate from the compressor 111 when the switch 5141 is connected to the switching position 3. Thus, the switching position 3 is a turn-off operation switching position. In the third preferred embodiment of the present invention, the user of the automobile 5 choose to keep the second transmission system 516 such that the air conditioning system 51 could be driven by the automobile engine 10. The relative advantages are that when either the first transmission system 515 is damaged, or it needs a maintenance, the user of the automobile 5 could use the air conditioning system 51 driven by the automobile engine 10, which provides more convenience to the user of the automobile 5 though no energy saving could be achieved under such a circumstances.

Please refer to FIG. 5(*d*), which shows the schematic circuit diagram of an air conditioning system having a self-sustained power supply apparatus 51 for an automobile 5 according to the fourth preferred embodiment of the present invention. The differences between the fourth and the third preferred embodiments of the present invention are that the self-sustained power supply apparatus 511 of the air conditioning system 51 of FIG. 5(*d*) is the same as that of FIG. 5(*b*), the output is also the first AC power supply Vac, and a AC motor 513 coupled to the first AC power supply is also employed to generate a kinetic energy. The AC motor 513 receives the first AC power supply Vac output from the self-sustained power supply apparatus 511 and generates a kinetic energy. And the remaining portion of the configuration and the operational principles of the air conditioning system 51 in FIG. 5(*d*) are the same as those of FIG. 5(*c*).

Furthermore, the self-sustained power supply apparatus 511 of the first to the fourth preferred embodiments of the air conditioning system 51 for the automobile 5 of the present invention as shown in FIGS. 5(*a*) to 5(*d*), could also be installed in a case (not shown), which contains one of the DC motor 512 and the AC motor 513 and the compressor 111.

Figure 6A:
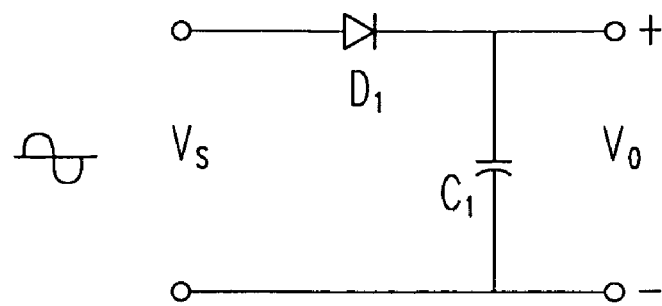
FIGS. 6(a) and 6(b) are showing the circuit diagrams of a half-wave bridge rectifier and a full-wave bridge rectifier, and employed in the preferred embodiments of the present invention respectively.
Figure 6B:
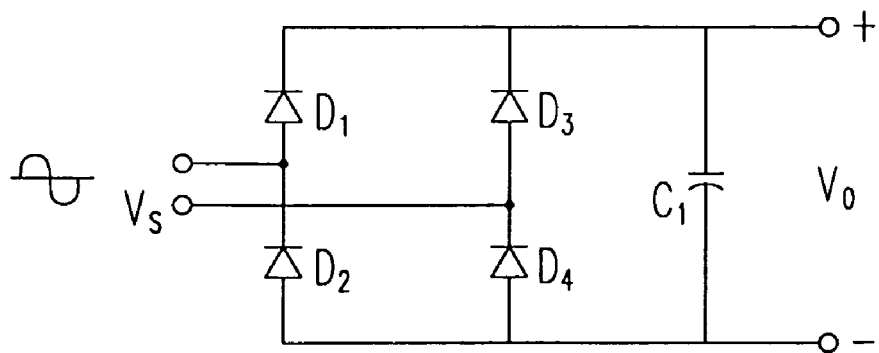

As for the rectifier 5113 of the first to the fourth preferred embodiments of the air conditioning system 51 for the automobile 5 of the present invention as shown in FIGS. 5(*a*) to 5(*d*), it could be one of a half-wave bridge rectifier and a full-wave bridge rectifier. FIGS. 6(*a*) and 6(*b*) are the circuit diagrams of the half-wave bridge rectifier and the full-wave bridge rectifier. In FIG. 6(*a*), the half-wave bridge rectifier includes a diode D1 and a filter capacitor C1, the input voltage of the half-wave bridge rectifier is an AC voltage Vs, and the output voltage of the half-wave bridge rectifier is DC voltage Vo. In FIG. 6(*b*), the full-wave bridge rectifier includes four diodes D1-D4 and a filter capacitor C1, the input voltage of the full-wave bridge rectifier is an AC voltage Vs, and the output voltage of the full-wave bridge rectifier is a DC voltage Vo. Besides, other different types of rectifiers are also applicable to the first to the fourth preferred embodiments of the present invention. Since the technology regarding the conventional rectifiers is a well-known prior art, the details regarding the contents of the technology would be omitted here.

Figure 7A:
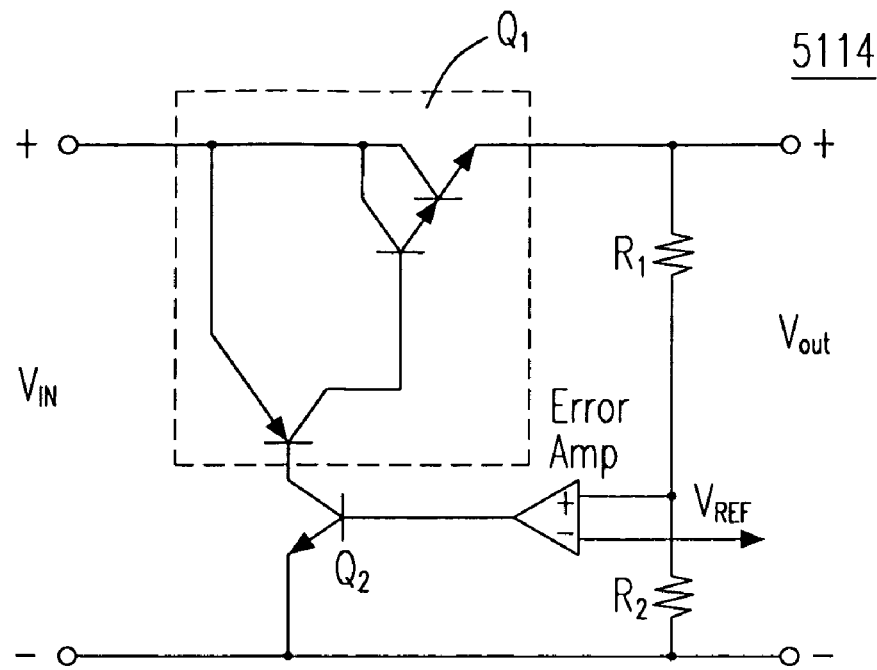
FIGS. 7(a) to 7(c) are showing the circuit diagrams of a NPN voltage regulator, a LDO voltage regulator and a Quasi LDO voltage regulator, which are the linear voltage regulators, and employed in the preferred embodiments of the present invention respectively.
Figure 7B:
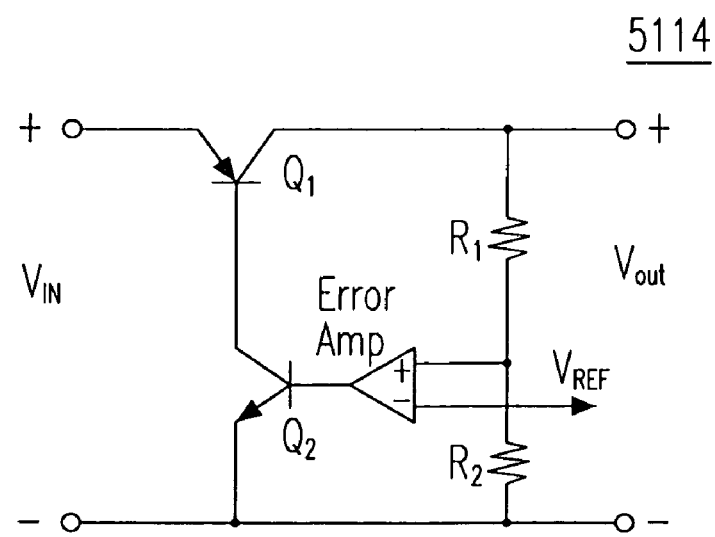
Figure 7C:
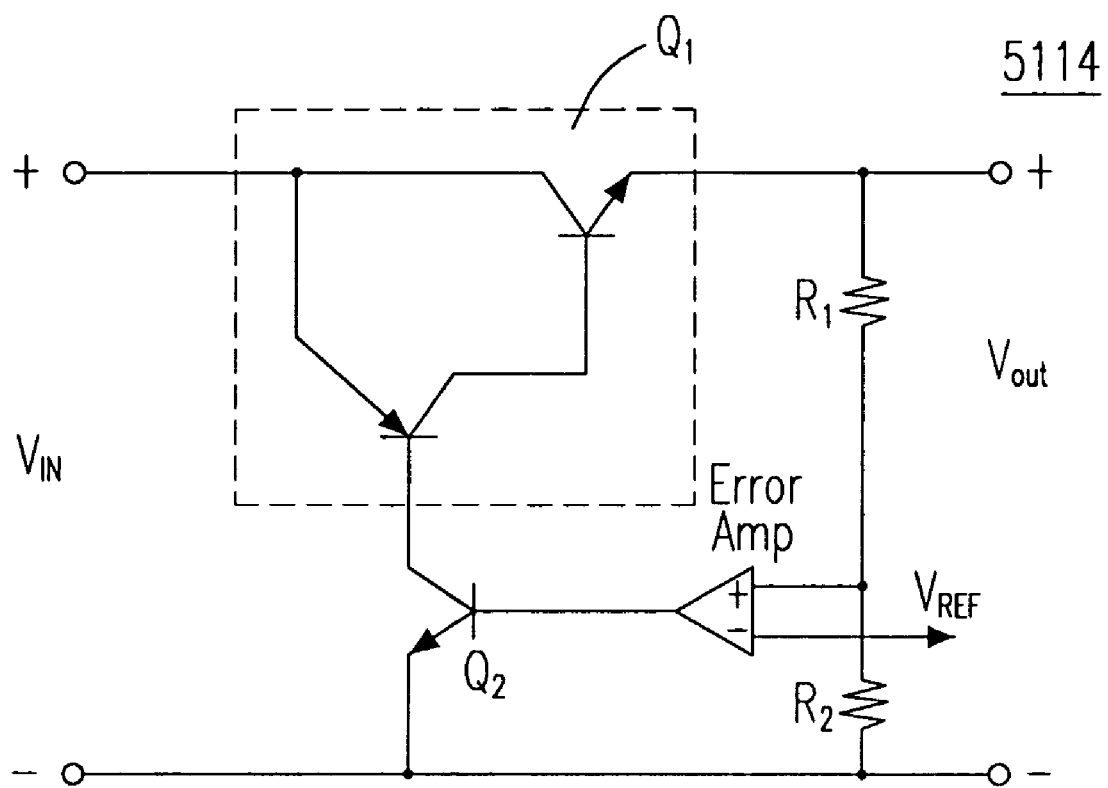

As for the regulator 5114 of the first to the fourth preferred embodiments of the air conditioning system 51 for the automobile 5 of the present invention as shown in FIGS. 5(*a*) to 5(*d*), it could be a linear voltage regulator, that is to say it could be one selected from a group consisting of an NPN voltage regulator, a LDO voltage regulator and a Quasi LDO voltage regulator. FIGS. 7(*a*) to 7(*c*) are the circuit diagrams of the NPN voltage regulator, the LDO voltage regulator and the Quasi LDO voltage regulator. In FIG. 7(*a*), the NPN voltage regulator includes a pass device Q1 (having a Darlington transistor and a PNP transistor), a NPN transistor Q2, an error amplifier Error Amp and a voltage divider (having resistors R1 and R2). In which, the output terminal of the Error Amp is coupled to the base of the transistor Q2, the inverting input terminal of the Error Amp is coupled to a connecting terminal of R1 and R2, and the non-inverting input terminal of the Error Amp is coupled to a reference voltage $V_{REF}$, the input voltage of the NPN voltage regulator is a DC voltage $V_{IN}$, and the output voltage of the NPN voltage regulator is a DC voltage $V_{OUT}$. In FIG. 7(*b*), the pass device Q1 of the LDO voltage regulator is a PNP transistor, and the remaining part is the same as the above-mentioned NPN voltage regulator. In FIG. 7(*c*), the pass device Q1 of the Quasi LDO voltage regulator includes a PNP transistor and a NPN transistor coupled to each other, the remaining part is the same as the above-mentioned NPN voltage regulator. Besides, other different types of regulators are also applicable to the first to the fourth preferred embodiments of the present invention. Since the technology regarding the conventional regulators is a well-known prior art, the details regarding the contents of the technology would be omitted here.

Figure 8A:
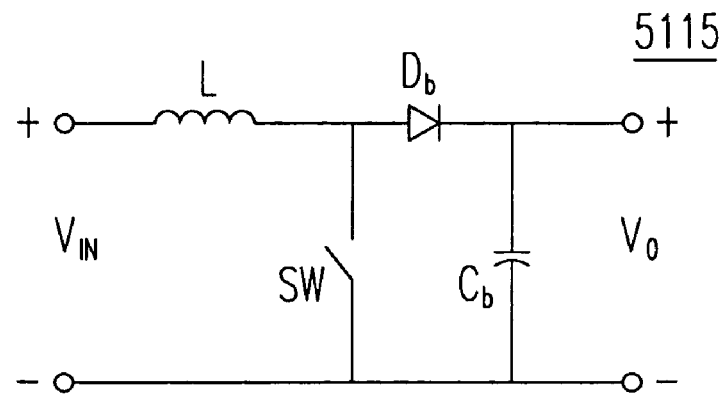
FIGS. 8(a) and 8(b) are showing the circuit diagrams of a boost converter and a buck-boost converter, which are DC/DC converters, and employed in the preferred embodiments of the present invention respectively.
Figure 8B:
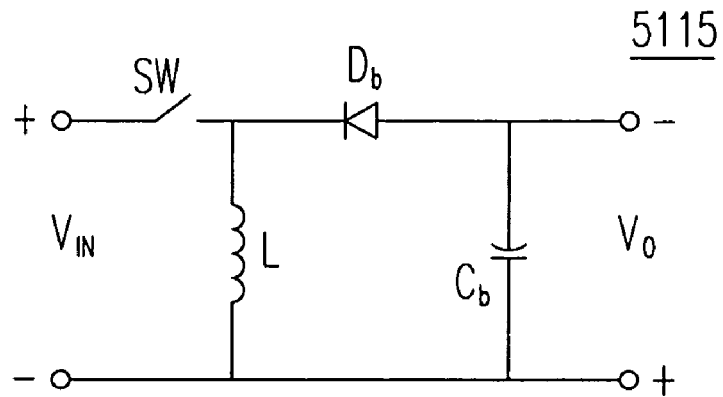

As for the DC/DC converter 5115 of the first to the fourth preferred embodiments of the air conditioning system 51 for the automobile 5 of the present invention as shown in FIGS. 5(*a*) to 5(*d*), it could be one of a boost converter and a buck-boost converter (for boosting). FIGS. 8(*a*) and 8(*b*) are the circuit diagrams of the boost converter and the buck-boost converter. In FIG. 8(*a*), the boost converter includes a switch SW, a diode Db, an inductor L and an output capacitor Cb. In which, the input voltage of the boost converter is a DC voltage $V_{IN}$, and the output voltage of the boost converter is a DC voltage $V_O$. In FIG. 8(*b*), the buck-boost converter includes the same components as the aforementioned boost converter, and except that the connecting configuration of the buck-boost converter is different from that of the boost converter, the remaining part is the same as the above-mentioned boost converter. Besides, other different types of converters are also applicable to the first to the fourth preferred embodiments of the present invention. Since the technology regarding the conventional converters is a well-known prior art, the details regarding the contents of the technology would be omitted here.

Figure 9A:
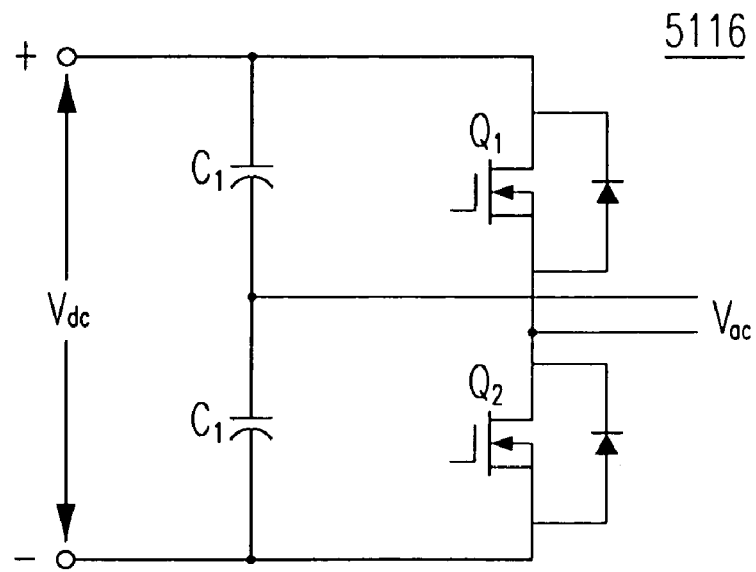
FIGS. 9(a) and 9(b) are showing the circuit diagrams of a single phase half-bridge inverter and a single phase full-bridge inverter, which are DC/AC inverters, and employed in the preferred embodiments of the present invention respectively.
Figure 9B:
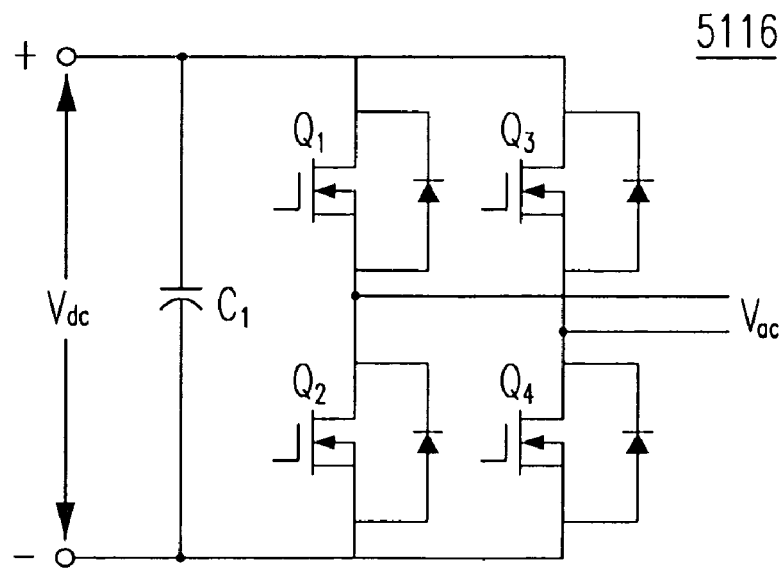

As for the DC/AC inverter 5116 of the first to the fourth preferred embodiments of the air conditioning system 51 for the automobile 5 of the present invention as shown in FIGS. 5(*a*) to 5(*d*), it could be one of a single-phase half-bridge inverter and a single-phase full-bridge inverter. FIGS. 9(*a*) and 9(*b*) are the circuit diagrams of the single-phase half-bridge inverter and the single-phase full-bridge inverter. In FIG. 9(*a*), the single-phase half-bridge inverter includes two filter capacitors C1 and C2 and two power switches Q1 and Q2. In which, the input voltage of the single-phase half-bridge inverter is a DC voltage Vdc, and the output voltage of the single-phase half-bridge inverter is an AC voltage Vac. In FIG. 9(*b*), the single-phase full-bridge inverter includes a filter capacitor C1 and four power switches Q1 to Q4, the input voltage of the single-phase full-bridge inverter is a DC voltage Vdc, and the output voltage of the single-phase full-bridge inverter is an AC voltage Vac. Besides, other different types of inverters are also applicable to the first to the fourth preferred embodiments of the present invention. Since the technology regarding the conventional inverters is a well-known prior art, the details regarding the contents of the technology would be omitted here.

Figure 10A:
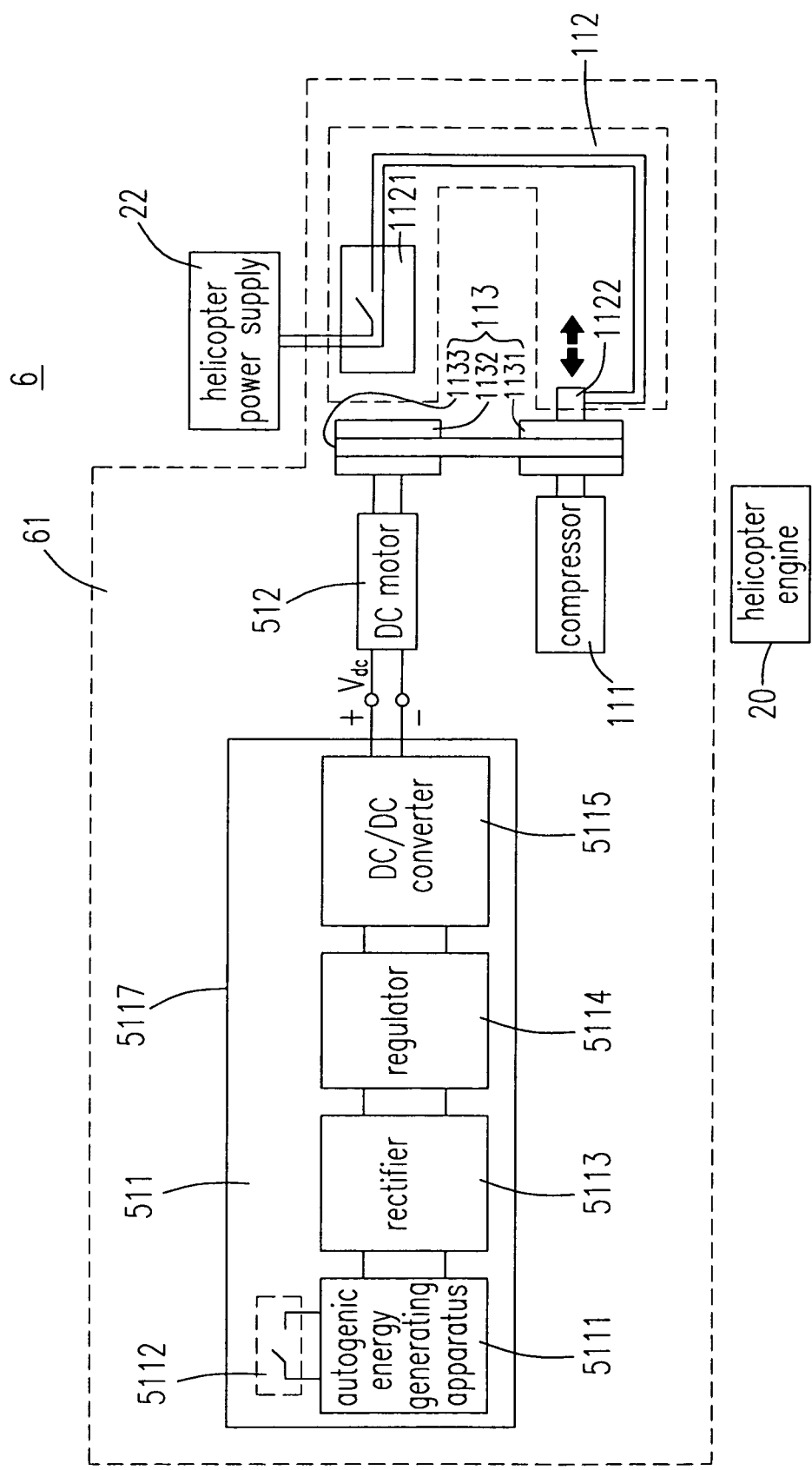
FIGS. 10(a) to 10(d) are the schematic circuit diagrams of an air conditioning system having a self-sustained power supply apparatus for an helicopter according to the first to the fourth preferred embodiments of the helicopter of the present invention respectively.
Figure 10B:
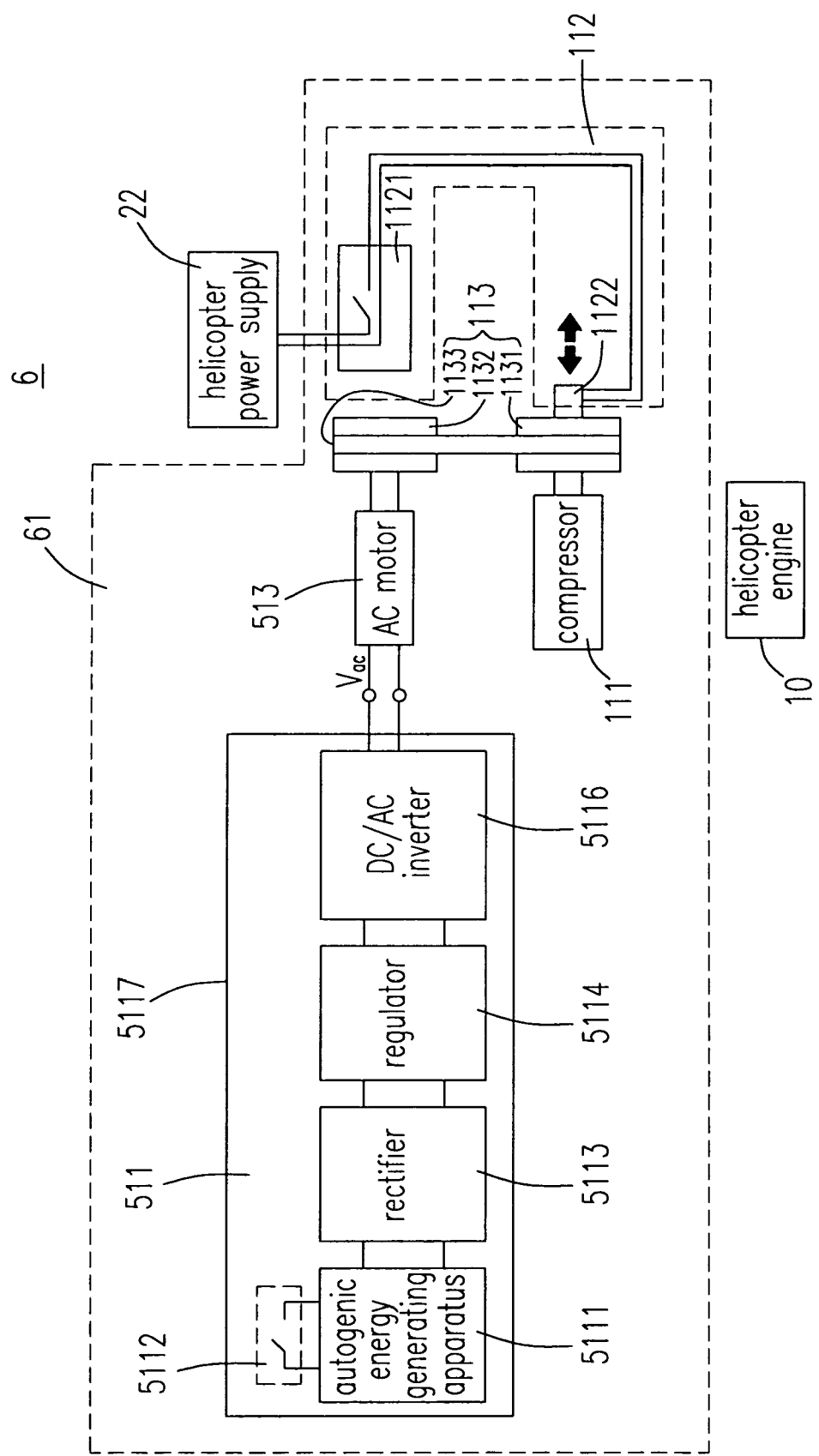
Figure 10C:
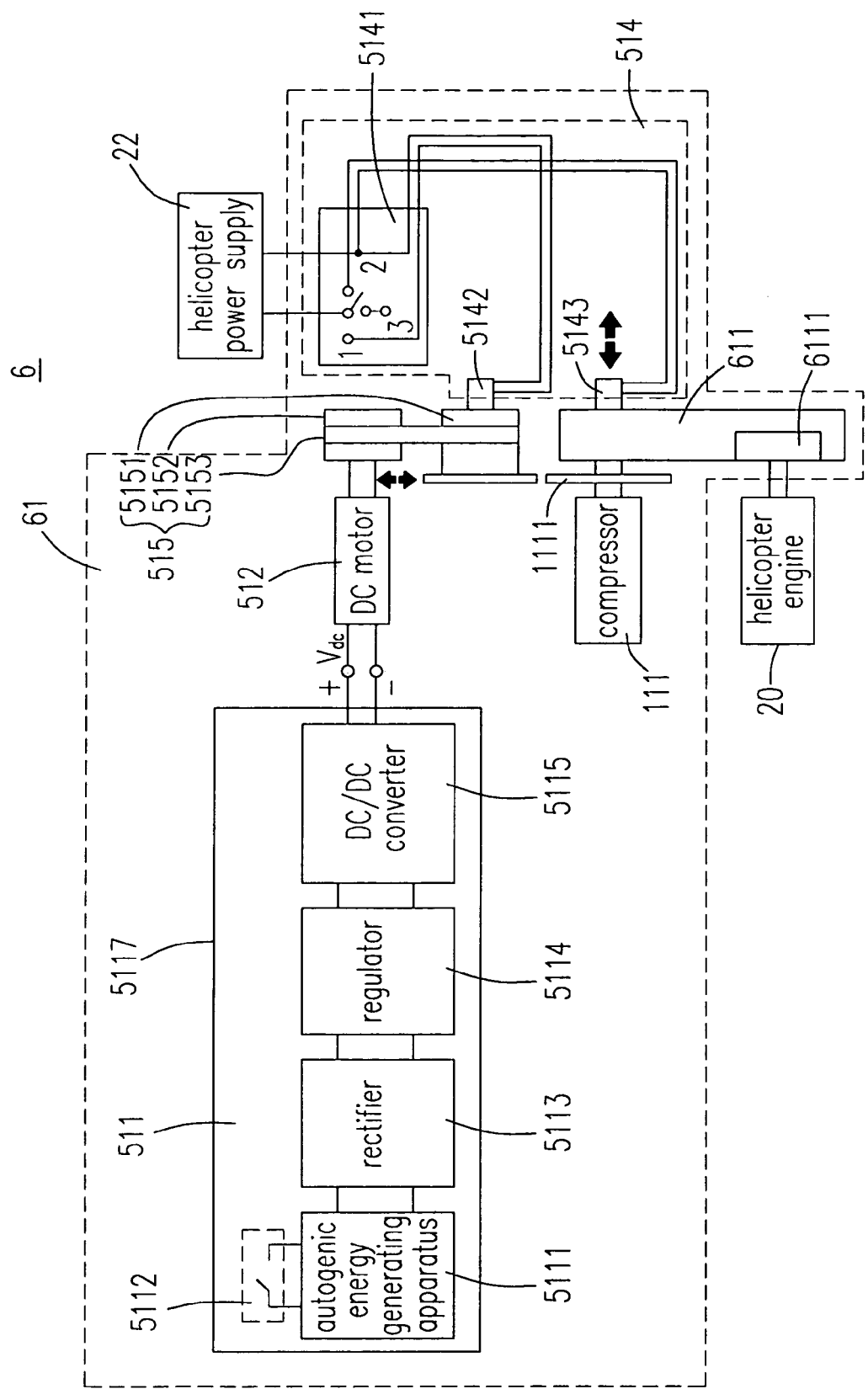
Figure 10:
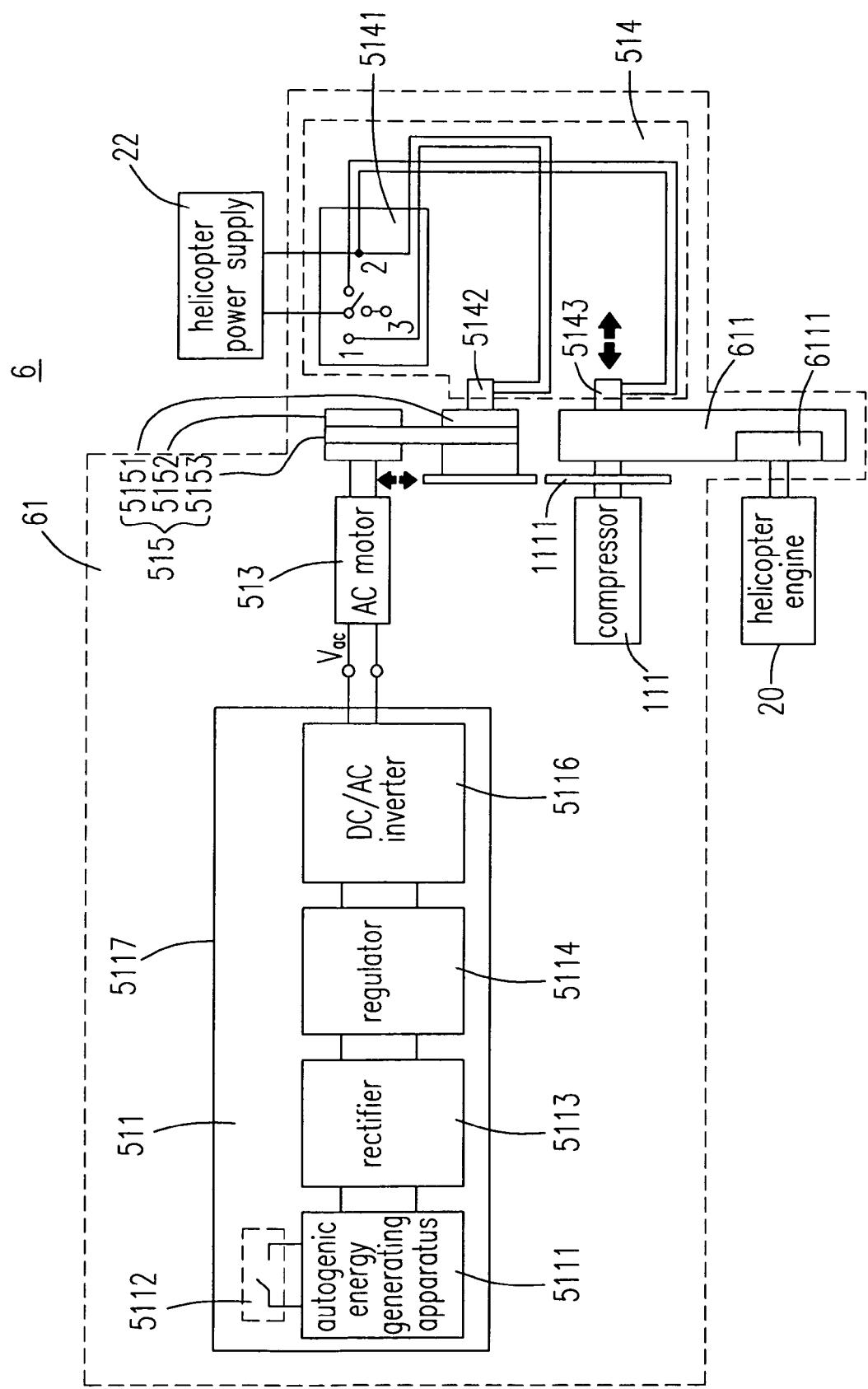
Figure 11A:
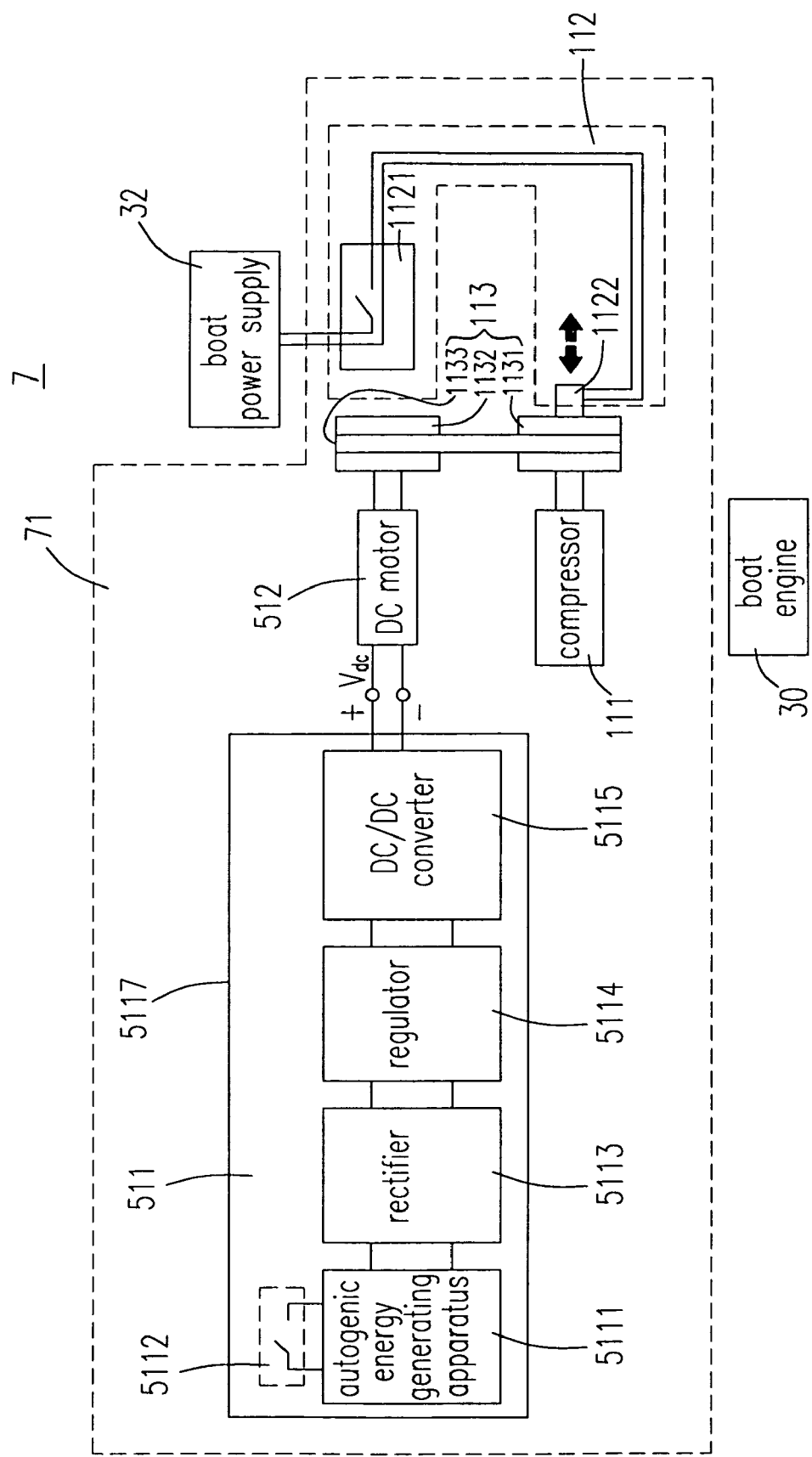
FIGS. 11(a) to 11(d) are the schematic circuit diagrams of an air conditioning system having a self-sustained power supply apparatus for a boat according to the first to the fourth preferred embodiments of the boat of the present invention respectively.
Figure 11B:
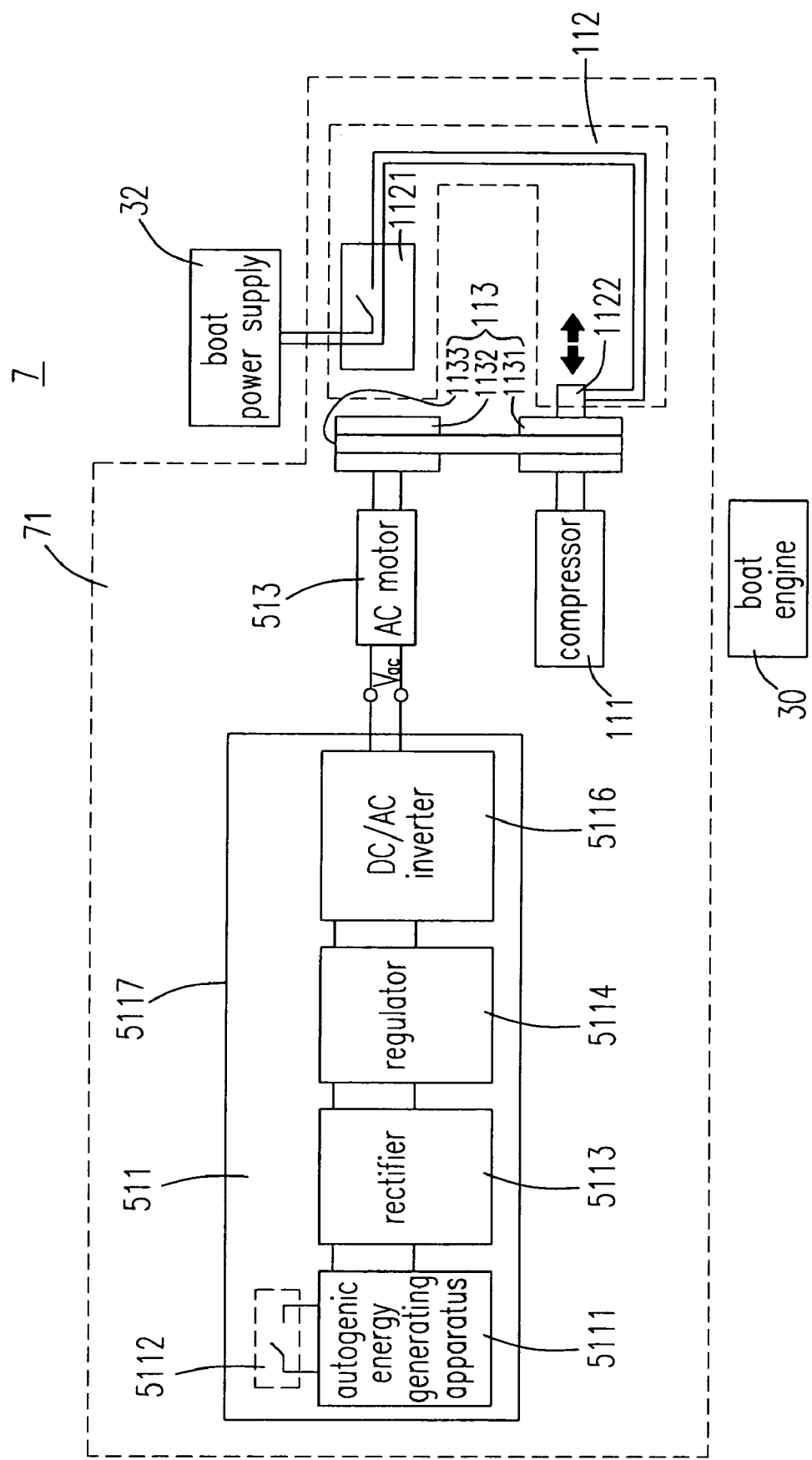
Figure 11C:
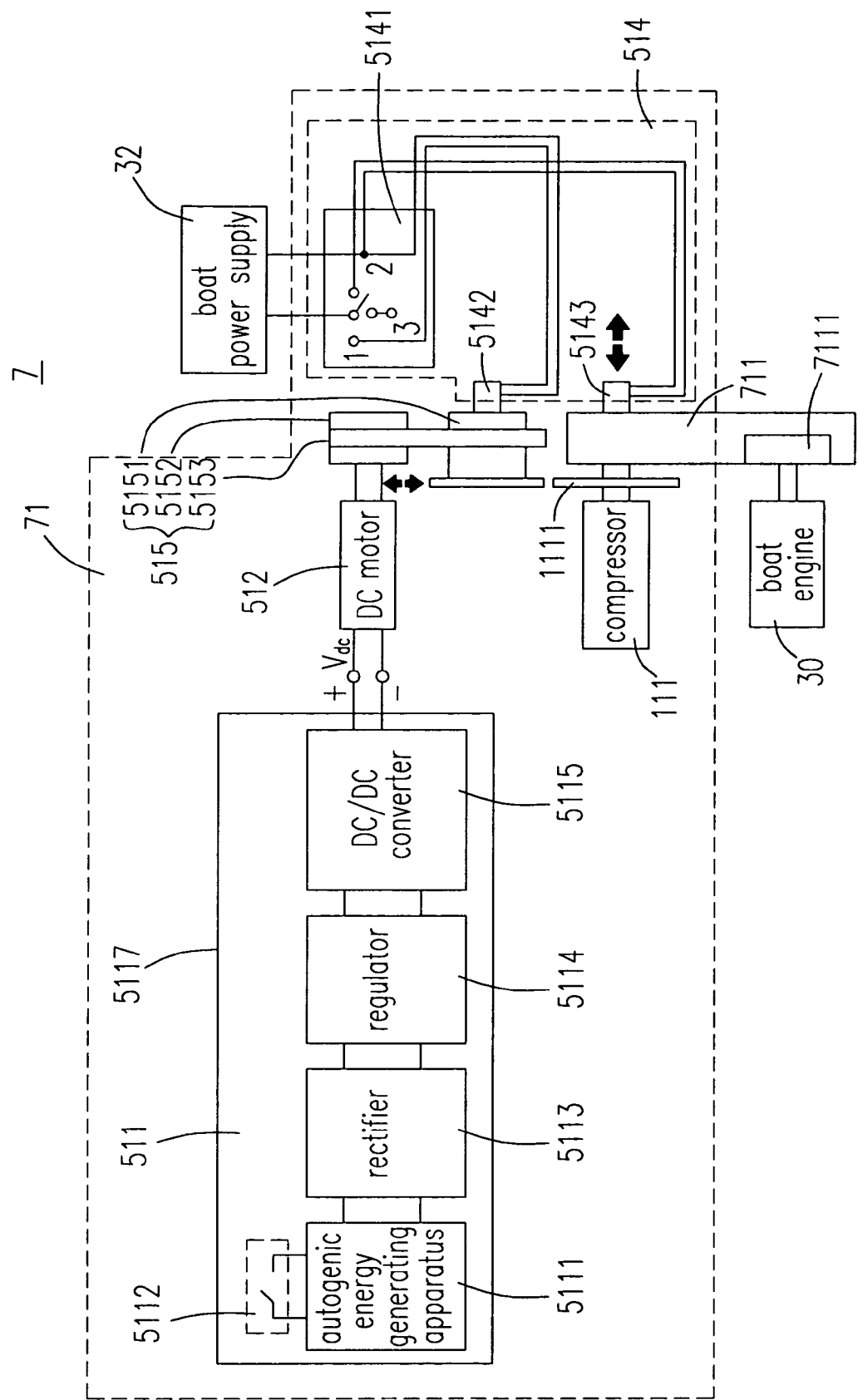
Figure 11D:
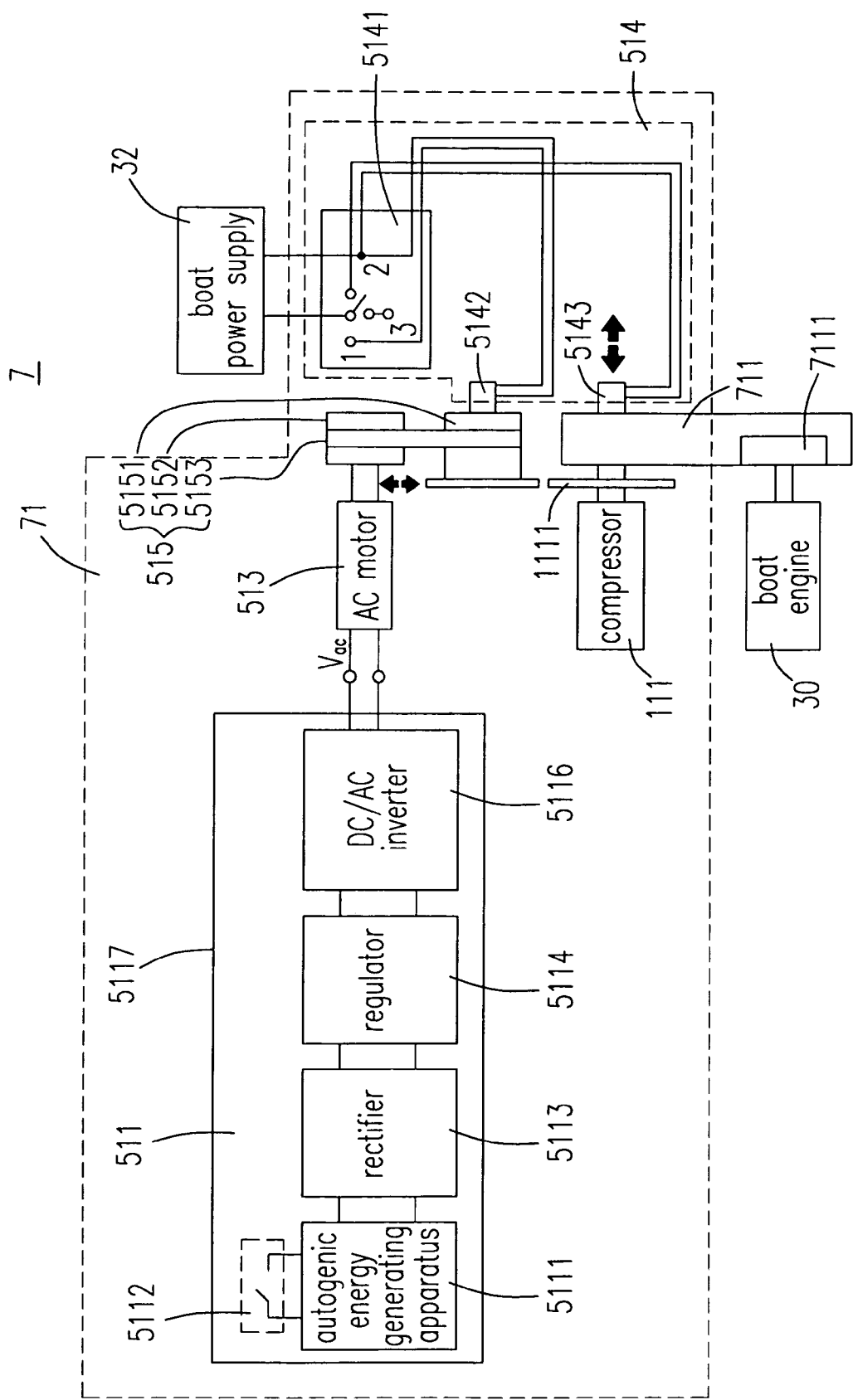

Please refer to FIGS. 10(*a*) to 10(*d*), which are the schematic circuit diagrams of air conditioning systems each having a self-sustained power supply apparatus 61 for a helicopter 6 according to the first to the fourth preferred embodiments of the present invention. In which, the helicopter 6 includes a helicopter engine 20, a helicopter power supply 22 and the air conditioning system having the self-sustained power supply apparatus 61. As shown in FIGS. 10(*a*) to 10(*d*), the schematic circuit diagrams of air conditioning systems each having a self-sustained power supply apparatus 61 for a helicopter 6 according to the first to the fourth preferred embodiments of the present invention are corresponding to the schematic circuit diagrams of air conditioning systems each having a self-sustained power supply apparatus 51 for an automobile 5 according to the first to the fourth preferred embodiments of the present invention as shown in FIGS. 5(*a*) to 5(*d*). The schematic circuit diagrams of air conditioning systems 61 for the helicopter 6 according to the first and the second preferred embodiments of the present invention of FIGS. 10(*a*) and 10(*b*) respectively has the same configuration and the operational principles just like those of the schematic circuit diagrams of air conditioning systems 51 for the automobile 5 according to the first and the second preferred embodiments of the present invention as shown in FIGS. 5(*a*) and 5(*b*) correspondingly. And the schematic circuit diagrams of air conditioning systems 61 for the helicopter 6 according to the third to the fourth preferred embodiments of the present invention of FIGS. 10(*c*) and 10(*d*) respectively has the same configuration and the operational principles just like those of the schematic circuit diagrams of air conditioning systems 51 for the automobile 5 according to the first and the second preferred embodiments of the present invention as shown in FIGS. 5(*c*) and 5(*d*) correspondingly. The differences are that the second transmission system 611 of the air conditioning system 61 for the helicopter 6 further includes a gear box 6111 of the third and the fourth preferred embodiments as shown in FIGS. 10(*c*) to 10(*d*). The gear box 6111 is coupled to the helicopter engine 20 and transmits a kinetic energy generated by the helicopter 6. And the second clutch 5143 copes with the switch 5141 being in the switching position 2 (or one of the switching positions 1 and 3) so as to generate an attractive (or a repulsive) force such that the second transmission system is connected to or separate from the compressor 111. The kinetic energy generated by the helicopter engine 20 is transmitted to the compressor 111 through the gear box 6111 and the second transmission system 611 when the second clutch 5143 generates the attractive force and make the second transmission system 611 connect to the compressor 111. And the remaining details regarding the configuration and the operational principles of the first to the fourth preferred embodiments of the air conditioning system 61 for the helicopter 6 are omitted here.

Please refer to FIGS. 11(*a*) to 11(*d*), which are the schematic circuit diagrams of air conditioning systems each having a self-sustained power supply apparatus 71 for a boat 7 according to the first to the fourth preferred embodiments of the present invention. In which, the boat 7 includes a boat engine 30, a boat power supply 32 and the air conditioning system having the self-sustained power supply apparatus 71. As shown in FIGS. 11(*a*) to 11(*d*), the schematic circuit diagrams of air conditioning systems each having a self-sustained power supply apparatus 71 for a boat 7 according to the first to the fourth preferred embodiments of the present invention are corresponding to the schematic circuit diagrams of air conditioning systems each having a self-sustained power supply apparatus 61 for a helicopter 6 according to the first to the fourth preferred embodiments of the present invention as shown in FIGS. 10(*a*) to 10(*d*). The schematic circuit diagrams of air conditioning systems 71 for the boat 7 according to the first to the fourth preferred embodiments of the present invention of FIGS. 11(*a*) to 11(*d*) respectively has the same configuration and the operational principles just like those of the schematic circuit diagrams of air conditioning systems 61 for the helicopter 6 according to the first to the fourth preferred embodiments of the present invention as shown in FIGS. 10(*a*) to 10(*d*) correspondingly. The differences are that the second transmission system 711 of the air conditioning system 71 for the boat 7 further includes a gear box 7111 of the third and the fourth preferred embodiments as shown in FIGS. 11(*c*) to 11(*d*). And the remaining details regarding the configuration and the operational principles of the first to the fourth preferred embodiments of the air conditioning system 71 for the boat 7 are omitted here.

From the above descriptions, the present invention provides the air conditioning system having the self-sustained power supply apparatus for engine-driven transportation tools, e.g., the automobile, the helicopter and the boat, such that the engine-driven transportation tools could have the effectiveness of saving the energy and having a relatively higher horsepower. Furthermore, the provided self-sustained power supply apparatus further includes a switch, which is employed to turn off the apparatus when it is necessary, to cut off the power supply of the air conditioning system for maintenance or saving the energy resources.

Although the invention has been shown and described in terms of specific embodiments, it will be evident that changes and modifications are possible which do not in fact depart from the inventive concepts taught herein. It will be appreciated by those skilled in the art that various omissions, additions and modifications may be made to the processes described above without departing from the scope of the invention, and all such modifications and changes are intended to fall within the scope of the invention, as defined in appended claims.

What is claimed is:

1. An air conditioning system for a vehicle, comprising:
   a self-sustained power supply apparatus comprising:
      an autogenic energy generating apparatus generating a first power supply; and
      a rectifier rectifying the first power supply into a second power supply; and
      a regulator regulating the second power supply and generating a third power supply;
   a motor receiving the third power supply from the self-sustained power supply apparatus and generating a kinetic energy;
   a transmission system transmitting the kinetic energy;
   a compressor; and
   a switching apparatus coupled to a fourth power supply and determining one of a connection and a separation between the transmission system and the compressor for optionally air conditioning the vehicle.

2. An air conditioning system according to claim 1, wherein the switching apparatus comprises:
   a switch determining one of a connection and a separation between the switching apparatus and the fourth power supply; and
   a clutch coupled to the switch and determining one of a connection and a separation between the transmission system and the compressor according to one of a power-on and a power-off of the switching apparatus respectively.

3. An air conditioning system according to claim 1, wherein the motor is a DC motor, and the compressor is coupled to the transmission system, receiving the kinetic energy, and generating an air conditioning operation for an interior air of the vehicle.

4. An air conditioning system according to claim 3, wherein the third power supply is a first DC power supply, the fourth power supply is a second DC power supply, the first power supply is an AC power supply, the second power supply is a third DC power supply, the third power supply is a fourth DC power supply and the self-sustained power supply apparatus further comprises:
   a switch determining one of a turn-on and a turn-off of the generating apparatus; and
   a DC/DC converter receiving and boosting the fourth DC power supply and generating the first DC power supply.

5. An air conditioning system according to claim 4, wherein the DC/DC converter is selected from a group consisting of a boost converter, a buck-boost converter and a flyback converter.

6. An air conditioning system according to claim 1, wherein the motor is an AC motor.

7. An air conditioning system according to claim 6, wherein the first power supply is a first AC power supply, the second power supply is a first DC power supply, and the self-sustained power supply apparatus comprises: an autogenic energy generating apparatus generating a second AC power supply; a switch determining one of a turn-on and a turn-off of the generating apparatus; a rectifier rectifying the second AC power supply into a second DC power supply; a regulator regulating the second DC power supply and generating a third DC power supply; and a DC/AC inverter receiving the third DC power supply and generating the first AC power supply.

8. An air conditioning system according to claim 1, providing an air conditioning operation comprising a heating operation and a cooling operation, and further comprising a temperature sensor, a condenser, an evaporator, one of an expansion valve and a capillary, a condenser fan and an evaporator fan, wherein the fourth power supply is provided by the vehicle, and the compressor is a vehicle air conditioning compressor.

9. An air conditioning system according to claim 1, wherein the transmission system comprises:
   a first crankshaft pulley;
   a second crankshaft pulley; and
   a belt encircling the first and the second crankshaft pulleys.

10. An air conditioning system according to claim 1, wherein the vehicle is an engine-driven transportation tool being one selected from a group consisting of an automobile, a helicopter and a boat.

* * * * *